United States Patent Office 3,591,662
Patented July 6, 1971

3,591,662
PHOSPHORUS CONTAINING ALPHA OXIMINO ACETIC ACID NITRILES
Walter Lorenz, Wuppertal, Vohwinkel, Christa Fest, Wuppertal, Elberfeld, Ingeborg Hammann, Cologne, Manfred Federmann and Winfried Flucke, Wuppertal, Elberfeld, and Wilhelm Stendel, Wuppertal, Vohwinkel, Germany, assignors to Farbenfabriken Bayer Aktiengesellschaft, Leverkusen, Germany
No Drawing. Filed May 26, 1966, Ser. No. 553,031
Claims priority, application Germany, June 26, 1965, F 46,446, Patent 1,238,902
Int. Cl. C07f 9/08; C07d 31/46; A01n 9/36
U.S. Cl. 260—940
22 Claims

ABSTRACT OF THE DISCLOSURE

Phosphorus-containing α-oximino-aryl acetic acid nitrile having the formula:

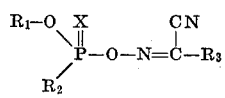

in which $R_1$ is alkyl and haloalkyl; $R_2$ is alkyl alkoxy, haloalkoxy, alkyl amino, di-alkyl amino, phenyl, phenoxy, cyclohexyl and cyclohexyloxy; $R_3$ is phenyl, naphthyl, pyridyl and substituted phenyl which is substituted with mono-, di- and trihalo, alkyl, alkoxy, alkyl mercapto and/or nitro; and X is oxygen and sulfur, which possess biocidal properties, and which may be prepared by reacting the corresponding phosphorus ester halide with the appropriate α-oximino arylacetic acid nitrile in the form of the corresponding salt or in the presence of an acid-binding agent. The compounds are pesticides.

---

The present invention relates to particular new phosphoryl-, phosphonyl-, thionophosphoryl- and thionophosphonyl-α-oximino-arylacetic acid nitriles having pesticidal, especially insecticidal and/or acaricidal, properties, to their compositions with dispersible carrier vehicles, and to methods for the preparation and use thereof.

It is already known that O,O-dialkyl-phosphoryl oximines can be prepared by reacting geminal halo-nitro- or -nitroso-alkanes with O,O,O-trialkyl-phosphorus acid esters in accordance with the following equation in which R, R' and R" represent alkyl radicals and Hal is preferably chlorine (cf. J. F. Allen, J.A.C.S., 79, 3071/1957):

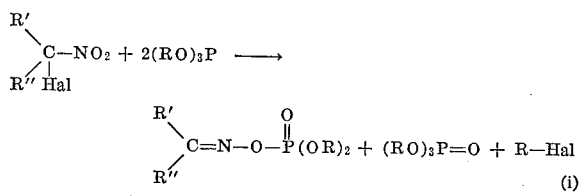

Furthermore, T. Mukaiyama and H. Nambu have described [see J. Org. Chem., 27 (2201/1962)] the reaction of alkali metal salts of nitroalkanes containing the nitro group attached to a secondary carbon atom, with O,O-dialkyl-phosphorus acid ester chlorides to form O,O-dialkyl-phosphoryl-oximino-alkanes. This reaction proceeds according to the following equation in which again R, R' and R" are alkyl radicals and Me represents an alkali metal atom:

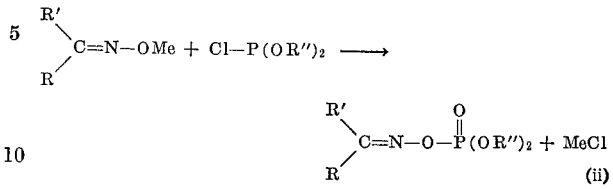

From German patent specification No. 1,052,981, there is also known, inter alia, the reaction of O,O-dialkylphosphoric or -thionophosphoric acid ester halides with oximes, preferably ketoximes, such as acetoxime. 4-chloroacetophenon- or cyclohexanone-oxime, in the form of their alkali metal salts or in the presence of agents which bind hydrogen halide, leading to O,O-dialkyl-(thiono)phosphoryl oximes, according to the following equation in which R and R" are alkyl radicals:

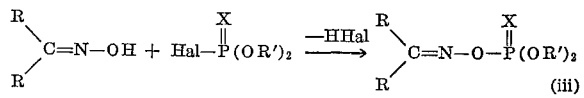

Finally, it is also possible, according to German patent specification No. 962,608, to react cyclic dicarboxylic acid hydroximides in the form of their alkali metal salts or in the presence of acid-binding agents, such as the oximes of ketones, with O,O-dialkyl-phosphoric or -thiono-phosphoric acid ester chlorides to form the corresponding N-(O,O-dialkyl-phosphoryl or -thionophosphoryl)-diacyl imides, for example:

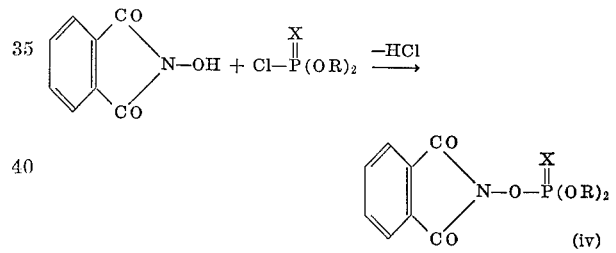

None of the methods of production known from the literature, however, leads to the phosphoryl- or thionophosphoryl-α-oximino-arylacetic acid nitriles of the present invention.

It is an object of the present invention to provide particular new phosphorus-containing esters, and especially phosphoryl-, phosphonyl-, thionophosphoryl- and thionophosphonyl-α-oximino-arylacetic acid nitriles, having valuable pesticidal, and especially arthropodicidal, properties; to provide pesticidal compositions in the form of mixtures of such compounds with liquid and solid dispersible carrier vehicles; to provide processes for preparing such compounds; and to provide methods of using such compounds in a new way especially for combating pests, such as insects and/or acarids.

Other and further objects of the present invention will become apparent from a study of the within specification and accompanying examples.

It has now been found, in accordance with the present invention, advantageously that the particular new phosphorus-containing α-oximino-aryl acetic acid nitriles having the formula:

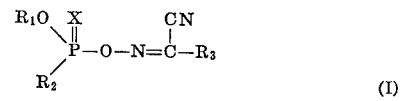

in which $R_1$ is selected from the group consisting of alkyl having 1 to 6 carbon atoms, and haloalkyl having 1 to 6 carbon atoms, $R_2$ is selected from the group consisting of alkyl having 1 to 4 carbon atoms, alkoxy having 1 to 4 carbon atoms, haloalkoxy having 1 to 4 carbon atoms, lower alkyl amino, di(lower) alkyl amino, phenyl, phenoxy, cyclohexyl, and cyclohexyloxy, $R_3$ is selected from the group consisting of phenyl, naphthyl, pyridyl, and substituted phenyl which is substituted with substituents selected from the group consisting of mono-, di-, and tri-halo, lower alkyl, lower alkoxy, lower alkyl mercapto, nitro, and mixtures thereof, and X is selected from the group consisting of oxygen and sulfur, possess valuable strong biocidal, for example pesticidal, and especially insecticidal and acaricidal, properties.

It has been further found in accordance with the present invention that a process for producing the compounds of Formula I above, readily and in good yields, may now be provided, which comprises reacting ester halide having the formula:

in which $R_1$, $R_2$ and X are the same as defined above and Hal is a halogen atom such as chloro, bromo, iodo, and fluoro, especially chloro, with α-oximino-arylacetic acid nitrile having the formula:

in which $R_3$ is the same as defined above, in the form of its corresponding salt, especially alkali metal salt, such as sodium or potassium salt, and alkaline earth metal salt, such as calcium, barium or strontium salt, as well as heavy metal salt, such as silver salt, or in the presence of acid-binding agents.

The course of the reaction is illustrated in greater detail by means of the following equation:

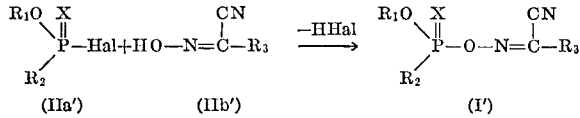

In this equation, $R_1$, $R_2$, $R_3$, Hal and X are the same as defined above.

Some of the α-oximino compounds used as starting materials for carrying out the process according to the present invention, for example, α-oximino-phenylacetic acid nitrile and its derivatives substituted in the phenyl nucleus, as well as the salts of these compounds have been described in the literature. Where such starting materials are new, they can be prepared by known methods. If the α-oximino-arylacetic acid nitriles occur in the form of two detectable and stable isomers (syn- and anti-form), this is of no importance for carrying out the reaction.

The reaction is preferably carried out in the presence of solvents or diluents. Low-boiling aliphatic-ketones and -nitriles, such as acetone, methyl ethyl ketone, methyl isopropyl ketone, methyl isobutyl ketone, acetonitrile, and propionitrile, and also optionally chlorinated aromatic or aliphatic hydrocarbons, such as benzene, toluene, xylenes, chlorobenzenes, methylene chloride, chloroform, carbon tetrachloride and mono-, di- and trichloroethylene, are preferred solvents. Finally, the reaction can also be carried out with the use of water as solvent, provided that the reactivity of the ester halides used permits this procedure.

As has already been mentioned above, the process according to the present invention is carried out with the use of salts of α-oximino-arylacetic acid nitriles. Alkali metal and alkaline earth metal salts, but also heavy metal salts (e.g. of silver), are mainly to be considered for this purpose. Instead of starting from these salts, it is also possible to use, with equally good results, the corresponding free α-oximino compounds as starting materials and to react these in the presence of acid-binding agents. Preferred examples of acid-binding agents are alkali metal carbonates and alcoholates, such as potassium and sodium carbonate, methylate and ethylate, as well as tertiary bases, for example, triethylamine, diethyl-aniline or pyridine.

The process can be carried out within a fairly wide range of temperature. In general, the operation is performed at room temperature or slightly to moderately elevated temperature, preferably at 20 to 30° C. Since, however, the reaction usually proceeds with a more or less pronounced positive heat effect, it is frequently necessary to cool the mixture externally, especially at the start of the reaction. Finally, it has proved expedient, in order to complete the reaction, to stir the mixture for some time (1 to 3 hours or overnight) after the starting components have been combined, with slight heating, if necessary.

The compounds according to the present invention are usually colourless to slightly yellow coloured, water-insoluble oils which can only be distilled in small amounts, even under strongy reduced pressure, because they are sensitive to the prolonged action of an elevated temperature; some of the new compounds occur in the form of colourless crystalline compounds which can easily be further purified by recrystallisation from conventional solvents or solvent mixtures.

The new phosphorus-containing esters according to the present invention have an extremely low toxicity towards warm-blooded animals and an outstanding biocidal, especially insecticidal and caricidal, activity which commences rapidly. The compounds can therefore, be successfully used in plant protection for combating noxious sucking and biting insects, Diptera and mites (Acari).

The sucking insects essentially include the aphids (Aphidae), such as *Myzus persicae, Doralis fabae, Rhopalosiphum padi., Macrosiphum p.i.s.i.* and *Macrosiphum solanifolii,* furthermore *Cryptomyzus korachelti, Sappaphis mali, Hyalopterus arundinis* and *Myzus cerasi,* as well as Coccina, for example, *Aspidiotus hederae* and *Lecanium hesperidum,* and also *Pseudococcus maritimus;* Thysanoptera, such as *Hercinothrips femoralis,* and bugs, for example, *Piesma quadrata, Dysdercuh intermedius, Cimex lectularius, Rhodnius prolixus* and *Triatoma infestans,* and, furthermore, cicades, such as *Euscelis bilobatus* and *Nephotettix bipunctatus.*

Among the biting insects, there are chiefly to be mentioned butterfly larvae (Lepidoptera), such as *Plutella maculipennis, Lymantria dispar, Euproctia chrysorrhoea* and *Malacosoma neustria,* furthermore *Mamestra brassicae* and *Agrotis segetum, Pieris brassicae, Cheimatobia brumata, Tortrix viridana, Laphygma frugiperda* and *Prodenia litera,* and also *Hyponomeuta padella, Ephestia kühniella and Galleria mellonella.*

The biting insects further include beetles (Coleoptera), for example, *Sitophilus granarius (Calandra granaria), Leptinotarsa decemlineata, Gastrophysa viridula, Phaedon cochleariae, Meligethes aeneus, Byturus tomentosus,* Bruchidius *(Acanthoscelides obtectus), Dermestes frischi, Trogoderma granarium, Tribolium casteneum,* Calandra or *Sitophilus zeamais, Stegobium paniceum, Tenebrio molitor* and *Oxyzaephilus surinamensis,* and also species living in the soil, for example, wire worms (Agriotes sp.) and cockchafer larvae (*Melolontha melolontha*); cockroaches, such as *Blatella germanica, Periplaneta americana,* Laucophaea or *Rhyparobia madeirae, Blatta orientalis, Blaberus giganteus* and *Blaberus fuscus,* as well as *Henschoutedenia flexivitta;* furthermore Orthoptera, for example, *Gryllus domesticus;* termites, such as *Reticulitermes flavipes* and Hymenoptera, such as ants, for example, *Lasius niger.*

The Diptera essentially comprise the flies, such as *Drosophila melanogaster, Ceratitis capitata, Musca domestica, Fannia canicularis, Phormia aegina* and *Calliphora erythrocephala,* as well as *Stomoxys calcitrans;* furthermore, gnats, for example, mosquitoes, such as *Aedes aegypti, Culex pipiens* and *Anopheles stephensi.*

The mites (Acari) mainly include the spider mites (Tetranychidae), such as *Tetranychus telarius* (*Tetranychus althaeae* or *Tetranychus urticae*), *Paratetranychus pilosus* (*Panonychus ulmi*), gall mites, for example, *Eriphyes ribis*, tarsonemides, for example, *Hemitarsonemus latus* and *Tarsonemus pallidus;* and, finally, ticks, such as *Ornithodorus moubata*.

When applied against pests affecting hygiene or stored goods, especially flies and gnats, the new compounds of the present invention are also characterised by an outstanding residual effect on wood and clay and by a good stability to alkali on limed substrates.

In the field of veterinary medicine, the new compounds according to the present invention are successfully applied against numerous noxious animal parasites (ecto- and endo-parasites), such as arachnids, insects and worms.

Of the ecto-parasites affecting animals, there may be mentioned of the class of Arachnidea: Ixodidae, such as *Boöphilus microplus* (strains which are normally sensitive and those which are resistant to phosphoric acid esters) and *Rhipicephalus bursa;* Gamasidae, such as *Dermanyssus gallinae;* Sarcoptidae, such as *Sarcoptes bovis, Sarcoptes canis, Psoroptes ovis, Psoroptes cuniculi* and *Myobia musculi*.

As ecto-parasites of the class of insects, there may be mentioned:

Mallophaga, such as *Trichodectes canis, Damalinea bovis* and *Eomenacanthus stramineus;* anoplura, such as *Haematopinus eurysternus;* Diptera, such as *Melophagus ovinus,* and larvae of Diptera living as parasites in warm-blooded animals, such as *Lucilia sericata, Lucilia cuprina, Chrysomyia chloropyga;* and larvae of warble flies, such as *Hypoderma bovis*. Aphaniptera, such as *Ctenocephalides canis*.

As endo-parasites affecting animals, there may be mentioned of the class of nematodes;

Strongylidae, such as *Oesophagostomum columbianum; Ancylostomatidae,* such as *Uncinaria stenocephala* and *Ancylostoma caninum;* Ascarididae, such as *Toxocara canis* and *Toxascaris leonina;* Trichostrongylidae, such as *Haemonchus contortus* and *Trichlostrongylus colubriformis;* Trichuridae, such as *Capillaria obsignata*.

Advantageously, the active compounds according to the present invention are equally suitable as insecticides and acaricides in plant protection and also for combating hygiene pests, for example in homes, stables and store rooms.

Thus, the new compounds of the instant invention can be used as pesticides either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanol-amine, etc.), amides (for instance, dimethyl formamides, etc.) sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight of the mixture, whereas carrier composition mixtures suitable for direct application or field application generally contemplate those in which the active compound is present in an amount substantially between about 0.00001 and 20%, preferably 0.01 and 5%, by weight of the mixture. Thus, the present invention contemplates over-all compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.00001 and 95% by weight of the mixture. Specifically, the active compound may be applied to a limed surface area in the foregoing field application ranges without losing the pesticidal activity of the compound even after extended periods of time in contact with such limed surface.

Furthermore, the present invention contemplates methods of combating pests, especially insects and acarids, which comprise applying to at least one of (a) such pests and (b) their habitat, a pesticidally, especially insecticidally and/or acaricidally, effective amount of the particular active compound of the invention alone or together with a carrier vehicle, as noted above. The instant formulations or compositions are applied in the usual manner, for example, by spraying, atomizing, vaporizing, scattering, dusting, watering, sprinkling, fumigating, and the like. It will be realized in accordance with the present invention that the instant compounds may be used effectively not only in plant protection but also in hygiene control, especially against insects and acarids and most significantly in connection with alkaline environments.

In the veterinary field, the new compounds of the present invention are applied in known manner, for example, by oral administration in the form of tablets, capsules, drinks or granules; by dermal application, for example, by immersing (dipping), spraying, pouring on or powdering; and by parenteral application, for example, in the form of injections.

In comparison with the active compounds of analogous constitution and of the same type of activity previously known from the literature, the new compounds of the present invention, surprisingly, are characterised by a substantially improved effectiveness and a considerably lower toxicity towards warm-blooded animals. The new compounds thus constitute a genuine enrichment of the art. This unexpected superiority and the outstanding effect of the new compounds according to the present invention, when applied against a great number of pests and animal parasites, can be seen from the following test results:

EXAMPLE A₁

Drosophila test

Solvent: 3 parts by weight acetone.
Emulsifier: 1 part by weight alkylaryl polygolycol ether.

To produce a suitable preparation of active compound. 1 part by weight of the active compound is mixed with the stated amount of solvent containing the stated amount of emulsifier and the concentrate is diluted with water to the desired concentration.

1 cc. of the preparation of the active compound is applied with a pipette to a filter paper disc of 7 cm. diameter. The wet disc is placed in a glass vessel containing 50 fruit flies (*Drosophila melanogaster*) and covered with a glass plate.

After the specified period of time, the destruction is determined as a percentage: 100% means that all the flies are killed; 0% means that none are killed.

The active compounds, their concentrations, the evaluation time and the degree of destruction can be seen from the following table:

TABLE A₁
[Plant damaging insects]

| Active compound | Concentration of active compound, percent | Degree of destruction after 24 hours, percent |
|---|---|---|
| A $(C_2H_5O)_2\overset{S}{\overset{\|}{P}}-O-N=\overset{CH_3}{\overset{\|}{C}}-\langle\text{phenyl}\rangle$ | 0.1<br>0.01 | 100<br>0 |
| (Control preparation according to German Spec. No. 1,052,981) | | |
| III₁ $(CH_3O)_2\overset{S}{\overset{\|}{P}}-O-N=\overset{CN}{\overset{\|}{C}}-\langle\text{phenyl}\rangle$ | 0.1<br>0.01<br>0.001<br>0.0001 | 100<br>100<br>100<br>20 |
| (According to invention) | | |
| IV₁ $(C_2H_5O)_2\overset{S}{\overset{\|}{P}}-O-N=\overset{CN}{\overset{\|}{C}}-\langle\text{phenyl}\rangle$ | 0.1<br>0.01<br>0.001 | 100<br>100<br>90 |
| (According to invention) | | |
| V₁ $(CH_3O)_2\overset{S}{\overset{\|}{P}}-O-N=\overset{CN}{\overset{\|}{C}}-\langle\text{phenyl}\rangle-Cl$ | 0.1<br>0.01<br>0.001 | 100<br>100<br>85 |
| (According to invention) | | |
| VI₁ $(C_2H_5O)_2\overset{S}{\overset{\|}{P}}-O-N=\overset{CN}{\overset{\|}{C}}-\langle\text{phenyl}\rangle-Cl$ | 0.1<br>0.01<br>0.001 | 100<br>100<br>30 |
| (According to invention) | | |
| VII₁ $(C_2H_5O)_2\overset{O}{\overset{\|}{P}}-O-N=\overset{CN}{\overset{\|}{C}}-\langle\text{phenyl}\rangle$ | 0.1<br>0.01 | 100<br>100 |
| (According to invention) | | |
| VIII₁ $\begin{array}{c}CH_3O\\\langle\text{phenyl-H}\rangle-O\end{array}\!\!\!\!\!\!\!\searrow\!\!\overset{S}{\overset{\|}{P}}-O-N=\overset{CN}{\overset{\|}{C}}-\langle\text{phenyl}\rangle$ | 0.1<br>0.01 | 100<br>90 |
| (According to invention) | | |
| IX₁ $\begin{array}{c}CH_3O\\C_2H_5O\end{array}\!\!\!\!\!\!\searrow\!\!\overset{S}{\overset{\|}{P}}-O-N=\overset{CN}{\overset{\|}{C}}-\langle\text{phenyl}\rangle$ | 0.1<br>0.01<br>0.001<br>0.0001 | 100<br>100<br>100<br>40 |
| (According to invention) | | |
| X₁ $\begin{array}{c}CH_3O\\\text{iso-}C_3H_7O\end{array}\!\!\!\!\!\!\searrow\!\!\overset{S}{\overset{\|}{P}}-O-N=\overset{CN}{\overset{\|}{C}}-\langle\text{phenyl}\rangle$ | 0.1<br>0.01<br>0.001 | 100<br>100<br>20 |
| (According to invention) | | |
| XI₁ $\begin{array}{c}CH_3O\\\text{iso-}C_3H_7O\end{array}\!\!\!\!\!\!\searrow\!\!\overset{S}{\overset{\|}{P}}-O-N=\overset{CN}{\overset{\|}{C}}-\langle\text{phenyl}\rangle-Cl$ | 0.1<br>0.01<br>0.001 | 100<br>100<br>70 |

TABLE A₁—Continued

| Active compound | Concentration of active compound, percent | Degree of destruction after 24 hours, percent |
|---|---|---|
| (According to invention) | | |
| XII₁ $\begin{array}{c}C_2H_5O\\ \diagdown\\ iso\text{-}C_3H_7O\end{array}\!\!\!\!\begin{array}{c}S\\\|\\P\end{array}\!\!-O-N=\overset{CN}{\underset{}{C}}-\phenyl$ | 0.1<br>0.01<br>0.001 | 100<br>100<br>85 |
| (According to invention) | | |
| XIII₁ $\begin{array}{c}CH_3O\\ \diagdown\\ sec.\text{-}C_4H_9O\end{array}\!\!\!\!\begin{array}{c}S\\\|\\P\end{array}\!\!-O-N=\overset{CN}{\underset{}{C}}-\phenyl$ | 0.1<br>0.01<br>0.001 | 100<br>100<br>20 |
| (According to invention) | | |
| XIV₁ $\begin{array}{c}C_2H_5O\\ \diagdown\\ C_2H_5\end{array}\!\!\!\!\begin{array}{c}S\\\|\\P\end{array}\!\!-O-N=\overset{CN}{\underset{}{C}}-\phenyl$ | 0.1<br>0.01<br>0.001 | 100<br>100<br>98 |
| (According to invention) | | |
| XV₁ $\begin{array}{c}C_2H_5O\\ \diagdown\\ C_2H_5\end{array}\!\!\!\!\begin{array}{c}O\\\|\\P\end{array}\!\!-O-N=\overset{CN}{\underset{}{C}}-\phenyl$ | 0.1<br>0.01<br>0.001 | 100<br>100<br>20 |
| (According to invention) | | |
| XVI₁ $(C_2H_5O)_2\overset{S}{\underset{\|}{P}}-O-N=\overset{CN}{\underset{}{C}}-\phenyl-SCH_3$ | 0.1<br>0.01 | 100<br>100 |
| (According to invention) | | |
| XVII₁ $(C_2H_5O)_2\overset{S}{\underset{\|}{P}}-O-N=\overset{CN}{\underset{}{C}}-pyridyl$ | 0.1<br>0.10 | 100<br>90 |
| (According to invention) | | |

EXAMPLE A₂

Lymantrin test

Solvent: 3 parts by weight acetone.
Emulsifier: 2 parts by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

Branches of white hawthorn (*Crataegua monogyna*) are sprayed with the preparation of the active compound until dew moist and infested with caterpillars of the gipsy moth (*Lymantria dispar*).

After the specified period of time, the degree of destruction is determined as a percentage. 100% means that all the caterpillars are killed, whereas 0% indicates none are killed.

The active compounds, their concentrations, the evaluation time and the results obtained can be seen from the following table:

TABLE A₂
[Plant damaging insects]

| Active compound | Concentration of active compound, percent | Degree of destruction after 3 days, percent |
|---|---|---|
| A $(C_2H_5O)_2\overset{S}{\underset{\|}{P}}-O-N=\overset{CH_3}{\underset{}{C}}-\phenyl$ | 0.1 | 80 |
| (Control preparation according to German Spec. No. 1,052,981) | | |
| IV₂ $(C_2H_5O)_2\overset{S}{\underset{\|}{P}}-O-N=\overset{CN}{\underset{}{C}}-\phenyl$ | 0.1<br>0.01<br>0.001 | 100<br>100<br>100 |
| XVIII₁ $(C_2H_5O)_2\overset{S}{\underset{\|}{P}}-O-N=\overset{CN}{\underset{}{C}}-\phenyl\text{-}Cl$ | 0.1<br>0.01<br>0.001 | 100<br>100<br>100 |
| IX₂ $\begin{array}{c}CH_3O\\ \diagdown\\ C_2H_5O\end{array}\!\!\!\!\begin{array}{c}S\\\|\\P\end{array}\!\!-O-N=\overset{CN}{\underset{}{C}}-\phenyl$ | 0.1<br>0.01<br>0.001 | 100<br>100<br>90 |

TABLE A₂—Continued

| Active compound | Concentration of active compound, percent | Degree of destruction after 3 days, percent |
|---|---|---|
| XIX₁ — (CH₃O)(iso-C₃H₇O)P(S)—O—N=C(CN)—C₆H₄—Cl | 0.1 / 0.01 / 0.001 | 100 / 100 / 80 |
| XIII₂ — (CH₃O)(sec.-C₄H₉O)P(S)—O—N=C(CN)—C₆H₅ | 0.1 / 0.01 / 0.001 | 100 / 100 / 100 |
| XV₂ — (C₂H₅O)(C₂H₅)P(O)—O—N=C(CN)—C₆H₅ | 0.1 / 0.01 / 0.001 | 100 / 100 / 100 |
| VIII₂ — (CH₃O)(C₆H₅—O)P(S)—O—N=C(CN)—C₆H₅ | 0.1 / 0.01 | 100 / 85 |
| XVII₂ — (C₂H₅O)₂P(S)—O—N=C(CN)—pyridyl | 0.1 / 0.01 | 100 / 60 |

EXAMPLE B

Plutella test

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified period of time, the degree of destruction is determined as a percentage: 100% means that all the caterpillars are killed, whereas 0% means that none are killed.

The active compounds, their concentrations, the evaluation time and the results obtained can be seen from the following table:

TABLE B
[Plant damaging insects]

| Active compound | Concentration of active compound, percent | Degree of destruction after 4 days, percent |
|---|---|---|
| IV₃ — (C₂H₅O)₂P(S)—O—N=C(CN)—C₆H₅ | 0.001 / 0.0001 | 100 / 100 |
| III₂ — (CH₃O)₂P(S)—O—N=C(CN)—C₆H₅ | 0.001 / 0.0001 | 100 / 60 |
| XX₁ — (C₃H₇O—iso)₂P(S)—O—N=C(CN)—C₆H₅ | 0.001 / 0.0001 | 100 / 50 |
| XXI₁ — (C₃H₇O-n)₂P(S)—O—N=C(CN)—C₆H₅ | 0.001 / 0.0001 | 100 / 40 |
| VI₂ — (C₂H₅O)₂P(S)—O—N=C(CN)—C₆H₄—Cl | 0.001 / 0.0001 / 0.00001 | 100 / 100 / 20 |
| XXII₁ — (C₂H₅O)(C₆H₅)P(S)—O—N=C(CN)—C₆H₅ | 0.001 | 100 |
| XIV₂ — (C₂H₅O)(C₂H₅)P(S)—O—N=C(CN)—C₆H₅ | 0.001 / 0.0001 | 100 / 50 |
| XII₂ — (C₂H₅O)(iso-C₃H₇O)P(S)—O—N=C(CN)—C₆H₅ | 0.001 / 0.0001 | 100 / 100 |

TABLE B—Continued
[Plant damaging insects]

| Active compound | | Concentration of active compound, percent | Degree of destruction after 4 days, percent |
|---|---|---|---|
| $X_2$ | $\begin{array}{c} CH_3O \\ \diagdown \\ iso\text{-}C_3H_7O \end{array} \overset{S}{\underset{\parallel}{P}} - O - N = \overset{CN}{\underset{\vert}{C}} - \langle phenyl \rangle$ | 0.001<br>0.0001 | 100<br>100 |
| $VII_2$ | $(C_2H_5O)_2\overset{O}{\underset{\parallel}{P}} - O - N = \overset{CN}{\underset{\vert}{C}} - \langle phenyl \rangle$ | 0.001 | 100 |

EXAMPLE C

Termite test

Solvent: Acetone.

A preparation of active compound is first produced by dissolving the amount of the active compound required for the desired concentration in the above solvent.

2 cc. of this solution of the active compound are applied, by means of a pipette, to a filter paper disc of about 9 cm. diameter. After leaving for 4 days to evaporate, 30 worker termies (*Reticulitermes flavipes*) are placed on the filter disc.

After the specified period of time, the degree of struction is determined as a percentage; 100% means that all the termites are killed, whereas 0% means that none are killed.

The active compounds, their concentrations, the evaluation time and the results obtained can be seen from the following table:

EXAMPLE D

Myzus test (contact action)

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*), which have been heavily infested with peach aphids (*Myzus persicae*), are sprayed with the preparation of the active compound until dripping wet.

After specified period of time, the degree of destruction is determined as a percentage: 100% means that all the aphids are killed whereas 0% means that none are killed.

The active compounds, their concentrations, the evaluation time and the results obtained can be seen from the following table:

TABLE D
[Plant damaging insects]

| Active compound | | Concentration of active compound, percent | Degree of destruction after 24 hours, percent |
|---|---|---|---|
| A | $(C_2H_5O)_2\overset{S}{\underset{\parallel}{P}} - O - N = \overset{CH_3}{\underset{\vert}{C}} - \langle phenyl \rangle$ | 0.1 | 60 |
| | (Control preparation according to German spec. No. 1,052,981) | | |
| $III_4$ | $(CH_3O)_2\overset{S}{\underset{\parallel}{P}} - O - N = \overset{CN}{\underset{\vert}{C}} - \langle phenyl \rangle$ | 0.1<br>0.01 | 100<br>80 |
| $IV_5$ | $(C_2H_5O)_2\overset{S}{\underset{\parallel}{P}} - O - N = \overset{CN}{\underset{\vert}{C}} - \langle phenyl \rangle$ | 0.1<br>0.01<br>0.001 | 100<br>100<br>90 |

TABLE C
[Plant damaging insects]

| Active compound | | Concentration of active compound, percent | Degree of destruction after 3 days, percent |
|---|---|---|---|
| $III_3$ | $(CH_3O)_2\overset{S}{\underset{\parallel}{P}} - O - N = \overset{CN}{\underset{\vert}{C}} - \langle phenyl \rangle$ | 0.005<br>0.0005 | 100<br>100 |
| $IV_4$ | $(C_2H_5O)_2\overset{S}{\underset{\parallel}{P}} - O - N = \overset{CN}{\underset{\vert}{C}} - \langle phenyl \rangle$ | 0.005<br>0.0005 | 100<br>100 |
| $X_3$ | $\begin{array}{c} CH_3O \\ \diagdown \\ i.C_3H_7O \end{array} \overset{S}{\underset{\parallel}{P}} - O - N = \overset{CN}{\underset{\vert}{C}} - \langle phenyl \rangle$ | 0.005<br>0.0005 | 100<br>100 |
| $XVIII_2$ | $(C_2H_5O)_2\overset{S}{\underset{\parallel}{P}} - O - N = \overset{CN}{\underset{\vert}{C}} - \langle phenyl\text{-}Cl \rangle$ | 0.005<br>0.0005 | 100<br>100 |

TABLE D—Continued

| Active compound | | Concentration of active compound, percent | Degree of destruction after 24 hours, percent |
|---|---|---|---|
| $XXI_2$ | $(C_3H_7O-n)_2\overset{S}{\overset{\|}{P}}-O-N=\overset{CN}{\overset{\|}{C}}-C_6H_5$ | 0.1<br>0.01 | 100<br>95 |
| $XX_2$ | $(C_3H_7O\text{-iso})_2\overset{S}{\overset{\|}{P}}-O-N=\overset{CN}{\overset{\|}{C}}-C_6H_5$ | 0.1<br>0.01 | 100<br>100 |
| $V_2$ | $(CH_3O)_2\overset{S}{\overset{\|}{P}}-O-N=\overset{CN}{\overset{\|}{C}}-C_6H_4-Cl$ | 0.1<br>0.01<br>0.001 | 100<br>100<br>85 |
| $VI_3$ | $(C_2H_5O)_2\overset{S}{\overset{\|}{P}}-O-N=\overset{CN}{\overset{\|}{C}}-C_6H_4-Cl$ | 0.1<br>0.01<br>0.001 | 100<br>100<br>70 |
| $XVIII_3$ | $(C_2H_5O)_2\overset{S}{\overset{\|}{P}}-O-N=\overset{CN}{\overset{\|}{C}}-C_6H_4-Cl$ (m-Cl) | 0.1<br>0.01<br>0.001 | 100<br>100<br>20 |
| $XXIII_1$ | $(C_2H_5O)_2\overset{S}{\overset{\|}{P}}-O-N=\overset{CN}{\overset{\|}{C}}-C_6H_4-Cl_3$ | 0.1<br>0.01<br>0.001 | 99<br>90<br>20 |
| $XXIV_1$ | $(C_2H_5O)_2\overset{S}{\overset{\|}{P}}-O-N=\overset{CN}{\overset{\|}{C}}-C_6H_3Cl_2$ (2,4-diCl) | 0.1<br>0.01<br>0.001<br>0.0001 | 100<br>100<br>95<br>40 |
| $X_4$ | $CH_3O-\overset{S}{\underset{\text{iso-}C_3H_7O}{\overset{\|}{P}}}-O-N=\overset{CN}{\overset{\|}{C}}-C_6H_5$ | 0.1<br>0.01<br>0.001<br>0.0001 | 100<br>100<br>95<br>50 |
| $XXV_1$ | $\underset{n-C_6H_{13}O}{\overset{C_2H_5O}{\diagdown}}\overset{S}{\overset{\|}{P}}-O-N=\overset{CN}{\overset{\|}{C}}-C_6H_5$ | 0.1<br>0.01 | 95<br>90 |
| $XIX_2$ | $\underset{\text{iso-}C_3H_7O}{\overset{CH_3O}{\diagdown}}\overset{S}{\overset{\|}{P}}-O-N=\overset{CN}{\overset{\|}{C}}-C_6H_4-Cl$ | 0.1<br>0.01<br>0.001<br>0.0001 | 100<br>100<br>99<br>40 |
| $XII_3$ | $\underset{\text{iso-}C_3H_7O}{\overset{C_2H_5O}{\diagdown}}\overset{S}{\overset{\|}{P}}-O-N=\overset{CN}{\overset{\|}{C}}-C_6H_5$ | 0.1<br>0.01<br>0.001 | 100<br>100<br>99 |
| $XIV_3$ | $\underset{C_2H_5}{\overset{C_2H_5O}{\diagdown}}\overset{S}{\overset{\|}{P}}-O-N=\overset{CN}{\overset{\|}{C}}-C_6H_5$ | 0.1<br>0.01<br>0.001 | 100<br>100<br>100 |
| $XV_3$ | $\underset{C_2H_5}{\overset{C_2H_5O}{\diagdown}}\overset{O}{\overset{\|}{P}}-O-N=\overset{CN}{\overset{\|}{C}}-C_6H_5$ | 0.1<br>0.01<br>0.001 | 100<br>100<br>70 |
| $VII_3$ | $(C_2H_5O)_2\overset{O}{\overset{\|}{P}}-O-N=\overset{CN}{\overset{\|}{C}}-C_6H_5$ | 0.1<br>0.01 | 100<br>99 |
| $XXVI_1$ | $(C_2H_5O)_2\overset{S}{\overset{\|}{P}}-O-N=\overset{CN}{\overset{\|}{C}}-C_6H_4-NO_2$ | 0.1<br>0.01 | 100<br>100 |
| $XXVII_1$ | $(n-C_3H_7O)_2\overset{S}{\overset{\|}{P}}-O-N=\overset{CN}{\overset{\|}{C}}-\text{pyridyl}$ | 0.1<br>0.01 | 100<br>100 |
| $XXVIII_1$ | $(C_2H_5O)_2\overset{S}{\overset{\|}{P}}-O-N=\overset{CN}{\overset{\|}{C}}-\text{naphthyl}$ | 0.1<br>0.1 | 99<br>90 |

EXAMPLE E

Tetranychus test

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaria*), which have a height of approximately 10–30 cm., are sprayed with the preparation of the active compound until dripping wet. The bean plants are heavily infested with spider mites (*Tetranychus urticae*) in all stages of development.

After specified periods of time, the effectiveness of the preparation of active compound is determined by counting the dead mites. The degree of destruction thus obtained is expressed as a percentage: 100% means that all the spider mites are killed, whereas 0% means that none are killed.

The active compounds, their concentrations, the evaluation time and the results obtained can be seen from the following table:

TABLE E
[Plant damaging mites]

| Active compound | | Concentration of active compound, percent | Degree of destruction after 48 hours, percent |
|---|---|---|---|
| A | $(C_2H_5O)_2\overset{S}{\overset{\|}{P}}-O-N=\underset{CH_3}{\overset{\|}{C}}-C_6H_5$ (Known from German spec. No. 1,052,981) | 0.1 | 50 |
| III$_5$ | $(CH_3O)_2\overset{S}{\overset{\|}{P}}-O-N=\underset{CN}{\overset{\|}{C}}-C_6H_5$ | 0.1 | 100 |
| IV$_6$ | $(C_2H_5O)_2\overset{S}{\overset{\|}{P}}-O-N=\underset{CN}{\overset{\|}{C}}-C_6H_5$ | 0.1 | 100 |
| VI$_4$ | $(C_2H_5O)_2\overset{S}{\overset{\|}{P}}-O-N=\underset{CN}{\overset{\|}{C}}-C_6H_4-Cl$ | 0.1 | 100 |
| XXIII$_2$ | $(C_2H_5O)_2\overset{S}{\overset{\|}{P}}-O-N=\underset{CN}{\overset{\|}{C}}-C_6H_4-Cl_3$ | 0.1 | 100 |
| XVIII$_4$ | $(C_2H_5O)\cdot \overset{S}{\overset{\|}{P}}-O-N=\underset{CN}{\overset{\|}{C}}-C_6H_3(Cl)$ | 0.1 | 100 |
| X$_5$ | $\underset{iso-C_3H_7O}{CH_3O}\overset{S}{\overset{\|}{P}}-O-N=\underset{CN}{\overset{\|}{C}}-C_6H_5$ | 0.1 | 100 |
| XIX$_3$ | $\underset{iso-C_3H_7O}{CH_3O}\overset{S}{\overset{\|}{P}}-O-N=\underset{CN}{\overset{\|}{C}}-C_6H_4-Cl$ | 0.1 | 100 |
| XII$_4$ | $\underset{iso-C_3H_7O}{C_2H_5O}\overset{S}{\overset{\|}{P}}-O-N=\underset{CN}{\overset{\|}{C}}-C_6H_5$ | 0.1 | 100 |
| XIV$_4$ | $\underset{C_2H_5}{C_2H_5O}\overset{S}{\overset{\|}{P}}-O-N=\underset{CN}{\overset{\|}{C}}-C_6H_5$ | 0.1 | 100 |
| XV$_4$ | $\underset{C_2H_5}{C_2H_5O}\overset{O}{\overset{\|}{P}}-O-N=\underset{CN}{\overset{\|}{C}}-C_6H_5$ | 0.1<br>0.01 | 100<br>95 |
| XXVI$_2$ | $(C_2H_5O)_2\cdot\overset{S}{\overset{\|}{P}}-O-N=\underset{CN}{\overset{\|}{C}}-C_6H_4-NO_2$ | 0.1 | 100 |

EXAMPLE F

The outstanding activity which the compounds according to the invention also have against a large number of other biting and sucking insect pests can be seen from the following table:

TABLE—Continued

| Active compound | Concentration of active compound, percent | Degree of destruction after 48 hours, percent |
|---|---|---|
| XVI$_2$ — $(C_2H_5O)_2P(S)$—O—N=C(CN)—C$_6$H$_4$—SCH$_3$ | 0.1 | 100 |
| XXIX$_2$ — $(C_2H_5O)_2P(S)$—O—N=C(CN)—C$_6$H$_4$—OCH$_3$ | 0.1 | 100 |
| XXVIII$_2$ — $(C_2H_5O)_2P(S)$—O—N=C(CN)—(naphthyl) | 0.1 | 100 |

TABLE F

| Active compound (constitution) | Concentration of active compound, percent | Caterpillars | | | | | | | | Beetles | | | | | | Aphids | | | | Bugs | | |
|---|---|---|---|---|---|---|---|---|---|---|---|---|---|---|---|---|---|---|---|---|---|---|
| | | Pieris brassicae | Euproctis chrysorrhoea | Cheimatobia brumata | Tortrix viridana | Malacosoma neustria | Laphygma frugiperda | Prodenia litura | Mamestra brassicae | Agrotis segetum | Meligethes aeneus | Byturus tomentosus | Gastrophysa viridula | Phaedon cochleariae | Leptinotarsa decemlineata | Doralis fabae | Aphidula schneideri | Cryptomyzus korschelti | Sappaphis mali | Hyalopterus arundinis | Myzus cerasi | Pseudococcus maritimus | Dysdercus intermedius |
| | | 3d | 2d | 3d | 2d | 2d | 3d | 3d | 3d | 3d | 5d | 4d | 3d | 3d | 2d | 24h | 24h | 24h | 24h | 24h | 24h | 10d | 3d |
| IV$_7$ 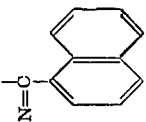 | 0.1 | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| | 0.02 | 100 | 100 | 100 | 100 | 100 | 100 | 100 | 100 | 100 | 100 | 100 | 100 | 100 | 100 | 100 | 100 | 100 | 100 | 100 | 100 | 80 | 85 |
| | 0.004 | 100 | 90 | 100 | 100 | 100 | 100 | 70 | 100 | 100 | 90 | 80 | 100 | 80 | 20 | 98 | 95 | 98 | 90 | 90 | 100 | | |
| | 0.0008 | 90 | | 100 | 80 | 100 | 100 | | 40 | | | 70 | 90 | | | 30 | 35 | 15 | 15 | 25 | 35 | | |
| | 0.00016 | | | | | | 30 | | | | | | | | | | | | | | | | |
| XVIII$_5$ | 0.1 | 100 | 100 | | | | 100 | 100 | 100 | 100 | | | | 100 | 100 | 100 | | | | | | | 100 |
| | 0.02 | 100 | 100 | | | | 100 | 100 | 100 | 30 | | | | 100 | 60 | 100 | | | | | | | |
| | 0.004 | 100 | 98 | | | | 80 | | | | | | | 80 | 30 | 98 | | | | | | | |
| | 0.0008 | 50 | 20 | | | | | | | | | | | 60 | | 20 | | | | | | | |
| | 0.00016 | | | | | | | | | | | | | | | | | | | | | | |

NOTE.—d=days; h=hours.

EXAMPLE G

Tick test

Solvent: 5 parts by weight ethyl glycol monomethyl ether
Emulsifier: 35 parts by weight nonylphenol polyglycol ether To produce a suitable formulation, 3 parts by weight of the active compound are mixed with 7 parts of the stated solvent/emulsifier mixture and the emulsion concentrate so obtained is diluted with water to the desired concentration.

Engorged adult female ticks of the species Boöphilus spec., Rhipicephalus spec. and Amblyomma spec. are dipped in these preparations of active compound for one minute. After dipping 10 female specimens of each of the various species, they are transferred to petri dishes, the bottom of which is covered with a filter disc of corresponding size. The effectiveness of the preparation of the active compound is determined after 24 hours by counting the severely affected and dead ticks. The degree of destruction found in this way is expressed as a percentage: 100% means that all the ticks are severely affected or killed at the concentration used, whereas 0% means that none of the ticks shows indications of any effect.

The active compounds, concentrations and parasites tested and the results obtained can be seen from the following table:

TABLE G

| | Active compound | Parasite | 100% effective critical concentration, p.p.m. |
|---|---|---|---|
| | $(C_2H_5O)_2\overset{S}{\overset{\|}{P}}-O-N=\overset{CN}{\overset{\|}{C}}-C_6H_5$ | Boöphilus microplus, normally resistant strain. | 2.5–5 |
| | | Boöphilus microplus, strain resistant to a number of phosphoric acid esters. | 5 |
| IV₈ | Same as above | Boöphilus decoloratus | 5 |
| | | Rhipicephalus bursa | 10 |
| | | Rhipicephalus evertsi | 25 |
| | | Rhipicephalus simus | 25 |
| | | Amblyomma hebraeum | 250 |
| XIX₄ | $\underset{CH_3O}{\overset{i\text{-}C_3H_7O}{\diagdown}}\overset{S}{\overset{\|}{P}}-O-N=\overset{CN}{\overset{\|}{C}}-C_6H_4\text{-}Cl$ | Boöphilus microplus, normally sensitive strain. | 1 |
| XIV₅ | $\underset{C_2H_5O}{\overset{C_2H_5}{\diagdown}}\overset{S}{\overset{\|}{P}}-O-N=\overset{CN}{\overset{\|}{C}}-C_6H_5$ | do | 1 |
| X₆ | $\underset{CH_3O}{\overset{i\text{-}C_3H_7O}{\diagdown}}\overset{S}{\overset{\|}{P}}-O-N=\overset{CN}{\overset{\|}{C}}-C_6H_4-Cl$ | do | 1 |
| VI₅ | $(C_2H_5O)_2\overset{S}{\overset{\|}{P}}-O-N=\overset{CN}{\overset{\|}{C}}-C_6H_4-Cl$ | do | 10 |
| XXI₃ | $(n\text{-}C_3H_7O)_2\overset{S}{\overset{\|}{P}}-O-N=\overset{CN}{\overset{\|}{C}}-C_6H_5$ | do | 10 |
| XXX₁ | $\underset{i\text{-}C_3H_7NH}{\overset{i\text{-}C_3H_7O}{\diagdown}}\overset{S}{\overset{\|}{P}}-O-N=\overset{CN}{\overset{\|}{C}}-C_6H_5$ | do | 25 |
| XII₅ | $\underset{i\text{-}C_3H_7O}{\overset{C_2H_5O}{\diagdown}}\overset{S}{\overset{\|}{P}}-O-N=\overset{CN}{\overset{\|}{C}}-C_6H_5$ | do | 1 |
| XX₃ | $(i\text{-}C_3H_7O)_2\overset{S}{\overset{\|}{P}}-O-N=\overset{CN}{\overset{\|}{C}}-C_6H_5$ | do | 10 |
| XI₂ | $\underset{CH_3O}{\overset{i\text{-}C_3H_7O}{\diagdown}}\overset{S}{\overset{\|}{P}}-O-N=\overset{CN}{\overset{\|}{C}}-C_6H_4-Cl$ | do | 2.5 |
| V₃ | $(CH_3O)_2\overset{S}{\overset{\|}{P}}-O-N=\overset{CN}{\overset{\|}{C}}-C_6H_4-Cl$ | do | 500 |

TABLE G—Continued

| Active compound | | Parasite | 100% effective critical concentration, p.p.m. |
|---|---|---|---|
| XVIII₆ | $(C_2H_5O)_2\overset{S}{\overset{\|}{P}}-O-N=\overset{CN}{\overset{\|}{C}}-\langle\phantom{O}\rangle-Cl$ | ....do.................. | 10 |
| III₆ | $\begin{array}{c}CH_3O\\ \phantom{CH_3O}\diagdown\\ \phantom{CH_3O}\diagup\overset{S}{\overset{\|}{P}}-O-N=\overset{CN}{\overset{\|}{C}}-\langle\phantom{O}\rangle\\ CH_3O\end{array}$ | ....do.................. | 10 |
| XXIV₂ | $(C_2H_5O)_2\overset{S}{\overset{\|}{P}}-O-N=\overset{CN}{\overset{\|}{C}}-\langle\overset{Cl}{\underset{Cl}{\phantom{O}}}\rangle$ | ....do.................. | 51 |

EXAMPLE H₁

Poultry mite test

Solvent: 35 parts by weight ethyl glycol monomethyl ether
Emulsifier: 35 parts by weight nonylphenol polyglycol ether To produce a suitable formulation, 3 parts by weight of the active compound are mixed with 7 parts by weight of the stated solvent and the emulsion concentrate so obtained is diluted with water to the desired concentration.

Larvae, nymphs and adults of *Dermanyssus gallinae,* which have been placed on filter paper strips, are intensively sprayed with these preparations of active compound. The mites are transferred, with the filter paper, to cylinders of "Plexiglas," one edge of which is covered with a very fine "Perlon" gauze, whereas the other is placed on a glass disc to prevent the mites from escaping. ("Plexiglas" and "Perlon" are registered trademarks.)

After the specified period of time, the effectiveness of the preparation of active compound is determined by counting the dead mites. The degree of destruction found in this way is expressed as a percentage: 100% means that all the mites are killed, whereas 0% means that none are killed.

The concentration of active compound, the evaluation time and the degree of destruction can be seen from the following table:

TABLE H₁

| Active compound | | Concentration of active compound, p.p.m. | Degree of destruction after 24 hours, percent |
|---|---|---|---|
| IV₉ | $(C_2H_5O)_2\overset{S}{\overset{\|}{P}}-O-N=\overset{CN}{\overset{\|}{C}}-\langle\phantom{O}\rangle$ | 1,000<br>500<br>100<br>50<br>10 | 100<br>100<br>100<br>91<br>55 |

EXAMPLE H₂

Sarcoptidae test

Solvent: 35 parts by weight ethyl glycol monomethyl ether
Emulsifier: 35 parts by weight nonylphenol polyglycol ether To produce a suitable formulation, 3 parts by weight of the active compound are mixed with 7 parts of the stated solvent/emulsifier mixture and the emulsion concentrate so obtained is diluted with water to the desired concentration.

Dogs which are infested with *Sarcoptes canis* in all stages of development, are dipped into the preparation of active compound, or cattle which are infested with *Sarcoptes bovis* in all stages of development, are sprayed with this preparation. After 72 hours, the effectiveness of the preparation is determined by examining the host animals for mites which are still alive, the degree of destruction of the parasites being expressed as a percentage.

The active compound, its concentration, the parasites and the results obtained can be seen from the following table:

TABLE H₂

| Active compound | | Parasite | 100%-effective concentration, p.p.m. |
|---|---|---|---|
| IV₁₀ | $(C_2H_5O)_2\overset{S}{\overset{\|}{P}}-O-N=\overset{CN}{\overset{\|}{C}}-\langle\phantom{O}\rangle$ | *Sarcoptes canis*....<br>*Sarcoptes bovis*..... | <500<br><500 |

EXAMPLE H₃

Sucking mite test/*Psoroptes cuniculi*

Solvent: xylene

To produce a suitable preparation of active compound, a definite amount by weight of active compound is mixed with a definite volume of the solvent and 1 part by volume of this solution is diluted with 10 parts by volume of liquid paraffin to the desired concentration.

Drops of the preparation of active compound so obtained are put on slides and about 30 mites of the species *Psoroptes cuniculi* in all stages of development are placed thereon 24 hours later. After a further 72 hours, the concentration is determined at which all the mites are severely affected or killed (effect: good).

The active compounds, the tested concentrations and the effective critical concentrations can be seen from the following table:

To produce a suitable preparation of active compound, 30 parts by weight of the active compound concerned are mixed with the stated amount of solvent containing the

TABLE H₃

| Active compound | | Concentration, p.p.m. | Effect |
|---|---|---|---|
| IV₁₁ | $(C_2H_5O)_2\overset{S}{\underset{\|}{P}}-O-N=\underset{\|}{\overset{CN}{C}}-\text{C}_6\text{H}_5$ | 100<br>50<br>25 | Good.<br>Do.<br>Partial effect. |
| VII₄ | $(C_2H_5O)_2\overset{O}{\underset{\|}{P}}-O-N=\underset{\|}{\overset{CN}{C}}-\text{C}_6\text{H}_5$ | 100<br>50<br>25<br>12.5 | Good.<br>Do.<br>Do.<br>Do. |
| XIV₆ | $\underset{C_2H_5O}{\overset{C_2H_5}{\diagdown}}\overset{S}{\underset{\|}{P}}-O-N=\underset{\|}{\overset{CN}{C}}-\text{C}_6\text{H}_5$ | 100<br>50<br>25 | Good.<br>Do.<br>Do. |
| X₇ | $\underset{CH_3O}{\overset{iso\text{-}C_3H_7O}{\diagdown}}\overset{S}{\underset{\|}{P}}-O-N=\underset{\|}{\overset{CN}{C}}-\text{C}_6\text{H}_5$ | 100 | Do. |
| VI₄ | $(C_2H_5O)_2\overset{S}{\underset{\|}{P}}-O-N=\underset{\|}{\overset{CN}{C}}-\text{C}_6\text{H}_4-Cl$ | 100 | Do. |
| XII₆ | $\underset{C_2H_5O}{\overset{iso\text{-}C_3H_7O}{\diagdown}}\overset{S}{\underset{\|}{P}}-O-N=\underset{\|}{\overset{CN}{C}}-\text{C}_6\text{H}_5$ | 100 | Do. |
| XIX₅ | $\underset{CH_3O}{\overset{iso\text{-}C_3H_7O}{\diagdown}}\overset{S}{\underset{\|}{P}}-O-N=\underset{\|}{\overset{CN}{C}}-\text{C}_6\text{H}_4-Cl$ | 100 | Do. |
| XVIII₇ | $(C_2H_5O)_2\overset{S}{\underset{\|}{P}}-O-N=\underset{\|}{\overset{CN}{C}}-\text{C}_6\text{H}_4-Cl$ | 100<br>50 | Do.<br>Do. |
| XXXI₁ | $(C_2H_5O)_2\overset{S}{\underset{\|}{P}}-O-N=\underset{\|}{\overset{CN}{C}}-\text{C}_6\text{H}_3\text{Cl}_2$ | 100<br>50 | Do.<br>Do. |
| IX₃ | $\underset{C_2H_5O}{\overset{CH_3O}{\diagdown}}\overset{S}{\underset{\|}{P}}-O-N=\underset{\|}{\overset{CN}{C}}-\text{C}_6\text{H}_5$ | 100<br>50 | Do.<br>Do. |
| XIII₃ | $\underset{CH_3O}{\overset{sec.\text{-}C_4H_9O}{\diagdown}}\overset{S}{\underset{\|}{P}}-O-N=\underset{\|}{\overset{CN}{C}}-\text{C}_6\text{H}_5$ | 100 | Do. |
| XXXII₁ | $\underset{C_2H_5O}{\overset{n\text{-}C_4H_9O}{\diagdown}}\overset{S}{\underset{\|}{P}}-O-N=\underset{\|}{\overset{CN}{C}}-\text{C}_6\text{H}_5$ | 100 | Do. |

EXAMPLE H₄

Mange mite test/mouse

Solvent: 35 parts by weight ethyl glycol monomethyl ether
Emulsifier: 35 parts by weight nonylphenol polyglycol ether stated amount of emulsifier and the concentrate so obtained is diluted with water to the desired concentration.

Mice are dipped into this preparation of active compound twice for 5 seconds with an interval of 5 seconds. The animals are heavily infested with *Myobia musculi* in all stages of development. After 48 hours, the concentration is determined at which all the mites are killed.

The active compounds and the effective concentrations can be seen from the following table:

To produce a suitable preparation, 3 parts by weight of the active compound are mixed with 7 parts by weight

TABLE H₄

| Active compound | | Concentration at which all the mites were killed, p.p.m. |
|---|---|---|
| IV₁₂ | $(C_2H_5O)_2\overset{S}{\overset{\|}{P}}-O-N=\underset{\underset{}{}}{\overset{CN}{C}}-C_6H_5$ | 200 |
| VII₅ | $(C_2H_5O)_2\overset{O}{\overset{\|}{P}}-O-N=\underset{}{\overset{CN}{C}}-C_6H_5$ | 400 |
| XIV₇ | $\underset{C_2H_5O}{\overset{C_2H_5}{\diagdown}}\overset{S}{\overset{\|}{P}}-O-N=\overset{CN}{C}-C_6H_5$ | 200 |
| X₈ | $\underset{CH_3O}{\overset{iso-C_3H_7O}{\diagdown}}\overset{S}{\overset{\|}{P}}-O-N=\overset{CN}{C}-C_6H_5$ | 200 |
| XXXIII₁ | $(C_2H_5O)_2\overset{S}{\overset{\|}{P}}-O-N=\overset{CN}{C}-C_6H_3Cl_2$ | 200 |
| XII₇ | $\underset{C_2H_5O}{\overset{iso-C_3H_7O}{\diagdown}}\overset{S}{\overset{\|}{P}}-O-N=\overset{CN}{C}-C_6H_5$ | 200 |
| XX₄ | $(iso-C_3H_7O)_2\overset{S}{\overset{\|}{P}}-O-N=\overset{CN}{C}-C_6H_5$ | 400 |
| XXIV₃ | $(C_2H_5O)_2\overset{S}{\overset{\|}{P}}-O-N=\overset{CN}{C}-C_6H_3Cl_2$ | 200 |
| IX₄ | $\underset{C_2H_5O}{\overset{CH_3O}{\diagdown}}\overset{S}{\overset{\|}{P}}-O-N=\overset{CN}{C}-C_6H_5$ | 400 |
| XXXII₂ | $\underset{C_2H_5O}{\overset{n-C_4H_9O}{\diagdown}}\overset{S}{\overset{\|}{P}}-O-N=\overset{CN}{C}-C_6H_5$ | 200 |
| XXIX₂ | $(C_2H_5O)_2\overset{S}{\overset{\|}{P}}-O-N=\overset{CN}{C}-C_6H_4-OCH_3$ | 400 |

EXAMPLE I

Biting lice test

Solvent: 35 parts by weight ethyl glycol monomethyl ether
Emulsifier: 35 parts by weight nonylphenol polyglycol ether of the stated solvent/emulsifier mixture and the emulsion concentrate is diluted with water to the desired concentration.

Cattle, sheep, dogs and fowl which are heavily infested with the following parasites:

Cattle—*Trichodectes scalaris*
Sheep—*Damalinea ovis*
Dogs—*Trichodectes canis*
Fowl—*Eomenacanthus stramineus* are sprayed with or bathed in the preparation of active compound. After 24 hours, the effectiveness of the preparation of active compound is determined by examining the host animals for parasites which are still alive, the degree of destruction of the parasites being given as a percentage.

The parasites, the concentrations of active compound and the results obtained are summarised in the following table:

To produce a suitable preparation of active compound, 30 parts by weight of the active compound concerned are mixed with the stated amount of solvent containing the stated amount of emulsifier and the concentrate so obtained is diluted with ovine or bovine serum to the desired concentration.

About 20 fly larvae (*Chrysomyia chloropyga* or *Lucilia sericata* or *Lucilia cuprina*) are placed in a small test tube containing 2 ml. of the preparation of active com-

TABLE I

| Active compound | Parasite | Concentration of active comp., p.p.m. | Degree of destruction after 24 hrs., percent |
|---|---|---|---|
| IV$_{13}$ — $(C_2H_5O)_2\overset{S}{\underset{\parallel}{P}}-O-N=\overset{CN}{\underset{\mid}{C}}-C_6H_5$ | *Trichodectes scalaris* | 100 | 100 |
| | | 50 | 100 |
| | | 25 | 100 |
| | *Damalinea ovis* | 100 | 100 |
| | *Trichodectes canis* | 100 | 100 |
| | | 50 | 100 |
| | | 10 | 100 |
| | *Eomenacanthus stramineus* | 100 | 100 |
| | | 50 | 100 |
| | | 10 | <50 |

EXAMPLE K$_1$

Test with parasitising fly larvae

Solvent: 35 parts by weight ethyl polyglycol monoethyl ether
Emulsifier: 35 parts by weight nonylphenol polyglycol ether pound adsorbed in cotton wool. After 48 hours, the degree of destruction is determined as a percentage: 100% means that all the larvae are killed, whereas 0% means that none are killed.

The active compounds, their concentrations and the results obtained can be seen from the following table:

TABLE K$_1$

| Active compound | Concentration of active compound, p.p.m. | Degree of destruction, percent | | |
|---|---|---|---|---|
| | | *Chrysomyia chloropyga* | *Lucilia sericata* | *Lucilia cuprina* |
| IV$_{14}$ — $(C_2H_5O)_2\overset{S}{\underset{\parallel}{P}}-O-N=\overset{CN}{\underset{\mid}{C}}-C_6H_5$ | 1.0 | 100 | 100 | 100 |
| | 0.5 | <50 | 100 | 100 |
| | 0.25 | 0 | >50 | >50 |
| III$_7$ — $(CH_3O)_2\overset{S}{\underset{\parallel}{P}}-O-N=\overset{CN}{\underset{\mid}{C}}-C_6H_5$ | 1.0 | 100 | | |
| | 0.5 | 50 | | |
| | 0.25 | <50 | | |
| XIV$_8$ — $\overset{C_2H_5}{\underset{C_2H_5O}{\diagup}}\overset{S}{\underset{\parallel}{P}}-O-N=\overset{CN}{\underset{\mid}{C}}-C_6H_5$ | 1.0 | 100 | | |
| | 0.5 | >50 | | |
| | 0.25 | 50 | | |
| X$_9$ — $\overset{iso-C_3H_7O}{\underset{CH_3O}{\diagup}}\overset{S}{\underset{\parallel}{P}}-O-N=\overset{CN}{\underset{\mid}{C}}-C_6H_5$ | 1.0 | 100 | | |
| | 0.5 | 100 | | |
| | 0.25 | <50 | | |
| VI$_7$ — $(C_2H_5O)_2\overset{S}{\underset{\parallel}{P}}-O-N=\overset{CN}{\underset{\mid}{C}}-C_6H_4-Cl$ | 1.0 | 100 | | |
| | 0.5 | 100 | | |
| | 0.25 | <50 | | |
| XII$_8$ — $\overset{iso-C_3H_7O}{\underset{C_2H_5O}{\diagup}}\overset{S}{\underset{\parallel}{P}}-O-N=\overset{CN}{\underset{\mid}{C}}-C_6H_5$ | 1.0 | 100 | | |
| | 0.5 | 100 | | |
| | 0.25 | 100 | | |
| XX$_5$ — $iso-(C_3H_7O)_2\overset{S}{\underset{\parallel}{P}}-O-N=\overset{CN}{\underset{\mid}{C}}-C_6H_5$ | 1.0 | 100 | | |
| | 0.5 | >50 | | |
| | 0.25 | <50 | | |
| V$_4$ — $(CH_3O)_2\overset{S}{\underset{\parallel}{P}}-O-N=\overset{CN}{\underset{\mid}{C}}-C_6H_4-Cl$ | 1.0 | >50 | | |
| | 0.5 | <50 | | |
| XI$_3$ — $\overset{iso-C_3H_7O}{\underset{CH_3O}{\diagup}}\overset{S}{\underset{\parallel}{P}}-O-N=\overset{CN}{\underset{\mid}{C}}-C_6H_4-Cl$ | 1.0 | 100 | | |
| | 0.5 | 100 | | |
| | 0.5 | 100 | | |
| XIX$_6$ — $\overset{iso-C_3H_7O}{\underset{CH_3O}{\diagup}}\overset{S}{\underset{\parallel}{P}}-O-N=\overset{CN}{\underset{\mid}{C}}-C_6H_4-Cl$ | 1.0 | 100 | | |
| | 0.5 | 100 | | |
| | 0.25 | >50 | | |

TABLE K₁—Continued

| Active compound | | Concentration of active compound, p.p.m. | Degree of destruction, percent | | |
|---|---|---|---|---|---|
| | | | Chrysomyia chloropyga | Lucilia sericata | Lucilia cuprina |
| XVIII₈ | $(C_2H_5O)_2\overset{S}{\overset{\|}{P}}-O-N=\overset{CN}{\overset{\|}{C}}-\underset{Cl}{\langle\bigcirc\rangle}$ | 1.0<br>0.5<br>0.25 | 100<br>100<br>>50 | | |
| XXIX₁ | $(C_2H_5O)_2\overset{S}{\overset{\|}{P}}-O-N=\overset{CN}{\overset{\|}{C}}-\langle\bigcirc\rangle-OCH_3$ | 1.0<br>0.5<br>0.25 | 100<br><50<br>0 | 100<br>>50<br><50 | |

EXAMPLE K₂

Systemic test for parasitising fly larvae in mice

Solvent: 35 parts by weight ethyl glycol monomethyl ether
Emulsifier: 35 parts by weight nonylphenol polyglycol ether To produce a suitable preparation of active compound, 30 parts by weight of the active compound are mixed with the stated amount of solvent containing the stated amount of emulsifier and the concentrate so obtained is diluted with water to such an extent that the amount of active compound to be applied to the test animals is conained in 0.5 cc. of this emulsion.

0.5 ml. of the preparation of active compound are administered by means of a pharyngoprobe or by intramuscular or subcutaneous injection to male mice having a weight of 20 g. At various time intervals after the treatment, the mice are killed and muscular test samples are taken, which are filled into small test tubes, in which 20–30 freshly matched fly larvae of the species *Lucilia sericata* are then placed. After 48 hours, the degree of destruction is determined as a percentage.

The active compounds tested, the dose applied and the 100% effective critical concentration can be seen from the following table:

TABLE K₂

| Active compound | | Dose, mg./kg. | 100% effective critical concentration | | |
|---|---|---|---|---|---|
| | | | Orally | Intramusc. | Subcutan. |
| IV₁₅ | $(C_2H_5O)_2\overset{S}{\overset{\|}{P}}-O-N=\overset{CN}{\overset{\|}{C}}-\langle\bigcirc\rangle$ | 25.0<br>12.5 | +<br>0 | +<br>+ | +<br>+ |
| IX₅ | $\underset{CH_3O}{\overset{C_2H_5O}{\diagdown}}\overset{S}{\overset{\|}{P}}-O-N=\overset{CN}{\overset{\|}{C}}-\langle\bigcirc\rangle$ | 25.0 | + | — | — |
| X₁₀ | $\underset{CH_3O}{\overset{iso\text{-}C_3H_7O}{\diagdown}}\overset{S}{\overset{\|}{P}}-O-N=\overset{CN}{\overset{\|}{C}}-\langle\bigcirc\rangle$ | 25.0 | + | — | — |
| VI₈ | $(C_2H_5O)_2\overset{S}{\overset{\|}{P}}-O-N=\overset{CN}{\overset{\|}{C}}-\langle\bigcirc\rangle-Cl$ | 25.0 | + | | |
| XIX₇ | $\underset{CH_3O}{\overset{iso\text{-}C_3H_7O}{\diagdown}}\overset{S}{\overset{\|}{P}}-O-N=\overset{CN}{\overset{\|}{C}}-\underset{Cl}{\langle\bigcirc\rangle}$ | 25.0 | + | — | — |
| XVIII₉ | $(C_2H_5O)_2\overset{S}{\overset{\|}{P}}-O-N=\overset{CN}{\overset{\|}{C}}-\underset{Cl}{\langle\bigcirc\rangle}$ | 25.0 | + | — | — |
| XXXIV₁ | $\underset{C_2H_5O}{\overset{CH_3}{\diagdown}}\overset{S}{\overset{\|}{P}}-O-N=\overset{CN}{\overset{\|}{C}}-\langle\bigcirc\rangle$ | 12.5 | + | — | — |

EXAMPLE K₃

Systemic test with warble fly larvae of cattle

Solvent: n-butanol degree of destruction of the parasites being expressed as a percentage.

The parasites, the concentrations of the active compound and the results obtained can be seen from the following table:

TABLE K₄

| Active compound | | Parasite | Concentration of active compound, p.p.m. | Degree of destruction after 24 hrs., percent |
|---|---|---|---|---|
| IV₁₇ | 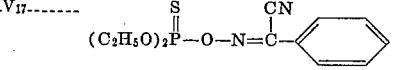 | Melophagus ovinus | 100 | 100 |
| | | Haematopinus eurysternus | 100 | 100 |
| | | | 50 | 100 |
| | | Ctenocephalides canis | 100 | 100 |
| | | | 50 | 100 |
| | | | 10 | 100 |
| | | | 5 | 50 |

To produce a suitable preparation of active compound, 10 parts by weight of the active compound are mixed with 90 parts by weight n-butanol.

Young cattle which are heavily infested with larvae of *Hypoderma bovis*, are treated with the preparation of active compound by pouring the preparation onto the median line of the animal, approximately between the withers and the root of tail. Three weeks after the treatment, the number of larvae which are still alive is determined and the effectiveness thus calculated as a percentage.

The active compound, the dose applied, the parasite and the percentage effect can be seen from the following table:

EXAMPLE L₁

Ancylostomatidae test/*Ancylostoma caninum*

The amount of active compound to be applied is administered as pure substance in capsules to the animals (dogs) to be treated. These are heavily infested with worms of the species *Ancylostoma caninum*. When the prepatent period has elapsed, the effect of the preparation of active compound is determined by counting the worms expelled after treatment and those remaining in the ani-

TABLE K₃

| Active compound | | Parasite | Dose, mg./kg. | Degree of destruction after 21 days, percent |
|---|---|---|---|---|
| IV₁₆ | 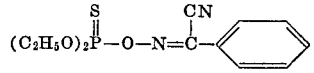 | Hypoderma bovis | 25 | >85 |
| | | Hypoderma bovis | 10 | <50 |

EXAMPLE K₄

Test for *Melophagus ovinus*, fleas and lice

Solvent: 35 parts by weight ethyl glycol monomethyl ether
Emulsifier: 35 parts by weight nonylphenol polyglycol ether mal and calculating therefrom the percentage of expelled worms.

The active compound and parasites tested, the dosage applied and the percentage effect can be seen from the following table:

TABLE L₁

| Active compound | | Parasite | Number of animals | Dose, mg./kg. animal | φ percentage effect |
|---|---|---|---|---|---|
| VII₆ | 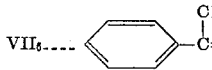 | Ancylostoma caninum | 1 | 5 | 91 |
| | | | 1 | 10 | 85 |
| | | | 5 | 15 | 74 |
| | | | 6 | 25 | 100 |

To produce a suitable formulation, 3 parts by weight of the active compound are mixed with 7 parts of the stated solvent/emulsifier mixture and the emulsion concentrate so obtained is diluted with water to the desired concentration.

Sheep which are heavily infested with *Melophagus ovinus*, cattle which are heavily infested with *Haematopinus eurysternus* and dogs which are heavily infested with *Ctenocephalides canis*, are sprayed with these preparations of active compound. After 24 hours, the effectiveness of the preparations is determined by examining the host animals for parasites which are still alive, the The symbol φ means the average percentage effect obtained from several test results.

EXAMPLE L₂

Ancylostomatidae test/*Uncinaria stenocephala*

The amount of active compound to be applied is administered as pure substance in capsules to the animals (dogs) to be treated. These are heavily infested with worm of the species *Uncinaria stenocephala*. When the prepatent period has elapsed, the effect of the preparation of active compound is determined by counting the worms expelled after treatment and those remaining in the animal and calculating therefrom the percentage of expelled worms.

The active compound and parasites tested, the dosage applied and the percentage effect can be seen from the following table:

TABLE L₂

| Active compound | | Parasite | Number of animals | Dose, mg./kg. animal | φ percentage effect |
|---|---|---|---|---|---|
| VII₇ |  | Uncinaria stenocephala | 1<br>1<br>4<br>3<br>1 | 5<br>10<br>15<br>25<br>50 | 0<br>77<br>84<br>100<br>100 | active compound is determined by counting the worms expelled after treatment and those remaining in the animal and calculating therefrom the percentage of expelled worms.

The active compound and parasites tested, the dosage applied and the percentage effect can be seen from the following table:

TABLE L₄

| Active compound | | Parasite | Number of animals | Dose, mg./kg. animal | φ percentage effect |
|---|---|---|---|---|---|
| VII₉ |  | Toxascaris leonina | 1<br>2<br>1<br>1 | 5<br>15<br>25<br>50 | 64<br>100<br>100<br>100 |

EXAMPLE L₃

Ascarid test/*Toxocara canis*

The amount of active compound to be applied is administered as pure substance in capsules to the animals (dogs) to be treated. These are heavily infested with worms of the species *Toxocara canis*. When the prepatent period has elapsed, the effect of the preparation of active compound is determined by counting the worms expelled after treatment and those remaining in the animal and calculating therefrom the percentage of expelled worms.

The active compound and parasites tested, the dosage applied and the percentage effect can be seen from the following table:

EXAMPLE M

Gastric-intestinal worm test/sheep

The following mixture is prepared:

Formulation auxiliaries: Percent by weight
Alginic acid propylene glycol ester _____ 0.16
Dioctyl sodium sulphosuccinate _____ 0.16
Water, ad _____ 100

The active compound to be applied is introduced into 60 ml. of the above mixture and suspended therein by means of an ultrastirrer.

Lambs which are heavily infested with worms of the species *Haemonchus contortus, Trichostrongylus colubri-*

TABLE L₃

| Active compound | | Parasite | Number of animals | Dose, mg./kg. animal | φ percentage effect |
|---|---|---|---|---|---|
| VII₈ |  | Toxocara canis | 2<br>2<br>6<br>3<br>2 | 5<br>10<br>15<br>25<br>50 | 98<br>94<br>88<br>100<br>100 |

EXAMPLE L₄

Ascarid test/*Toxascaris leonina*

The amount of active compound to be applied is administred as pure substance in capsules to the animals (dogs) to be treated. These are heavily infested with worms of the species *Toxascaris leonina*. When the prepatent period has elapsed, the effect of the preparation of

*formis* and *Oesophagostomum columbianum* are treated orally with the preparation of active compound so obtained. When the prepatent period has elapsed, the effect of the preparation is determined by counting the worms expelled after the treatment and those remaining in the animal and calculating therefrom the percentage of expelled worms.

The active compounds, parasites, dosage employed and the effect obtained can be seen from the following table:

TABLE M

| Active compound | | Parasite | Dose, mg./kg | Percentage effect |
|---|---|---|---|---|
| IV₁₈ | $(C_2H_5O)_2$$\overset{S}{\underset{\|}{P}}$—O—N=$\overset{CN}{\underset{\|}{C}}$—⟨phenyl⟩ | Haemonchus contortus | 10<br>25<br>50 | <50<br>50<br>100 |
|  |  | Trichostrongylus colubriformis | 10<br>25<br>50 | <70<br>85<br>100 |
|  |  | Oesophagostomum columbianum | 50 | 70 |
| III₈ | $(CH_3O)_2$$\overset{S}{\underset{\|}{P}}$—O—N=$\overset{CN}{\underset{\|}{C}}$—⟨phenyl⟩ | Haemonchus contortus | 250 | 100 |

TABLE M—Continued

| Active compound | | Parasite | Dose, mg./kg. | Percentage effect |
|---|---|---|---|---|
| $X_{11}$ | $CH_3O$ — $\overset{S}{\underset{\|}{P}}$ — $O$ — $N$ = $\overset{CN}{\underset{\|}{C}}$ — phenyl, with $i\text{-}C_3H_9O$ | Haemonchus contortus | 20 | 100 |
| $VI_9$ | $(C_2H_5O)_2$ — $\overset{S}{\underset{\|}{P}}$ — $O$ — $N$ = $\overset{CN}{\underset{\|}{C}}$ — phenyl—Cl | Haemonchus contortus | 100 | 100 |
| $XX_6$ | $(i\text{-}C_3H_7O)_2$ — $\overset{S}{\underset{\|}{P}}$ — $O$ — $N$ = $\overset{CN}{\underset{\|}{C}}$ — phenyl | Haemonchus contortus | 200 | 100 |
| $XI_4$ | $CH_3O$ — $\overset{S}{\underset{\|}{P}}$ — $O$ — $N$ = $\overset{CN}{\underset{\|}{C}}$ — phenyl—Cl, with $i\text{-}C_3H_7O$ | Haemonchus contortus | 50 | 100 |
| $XXXV_1$ | $CH_3O$ — $\overset{S}{\underset{\|}{P}}$ — $O$ — $N$ = $\overset{CN}{\underset{\|}{C}}$ — phenyl (Cl on ring), with $n\text{-}C_3H_7O$ | Haemonchus contortus | 50 | 100 |
| $XXIV_4$ | $(C_2H_5O)_2$ — $\overset{S}{\underset{\|}{P}}$ — $O$ — $N$ = $\overset{CN}{\underset{\|}{C}}$ — dichlorophenyl | Haemonchus contortus | 25 | 100 |
| $XXXVI_1$ | $(ClCH_2CH_2O)_2$ — $\overset{S}{\underset{\|}{P}}$ — $O$ — $N$ = $\overset{CN}{\underset{\|}{C}}$ — phenyl | Haemonchus contortus | 50 | >70 |

EXAMPLE N

Capillaria test/*Capillaria obsignata*

The amount of active compound to be applied is administered as pure substance in capsules to the animals (fowl) to be treated. These are heavily infested with worms of the species *Capillaria obsignata*. When the prepatent period has elapsed, the effect of the preparation of effective compound is determined by counting the worms expelled after treatment and those remaining in the animal and calculating therefrom the percentage of expelled worms.

The active compound, parasite tested, the dosage applied and the effect obtained can be seen from the following table:

TABLE N

| Active compound | | Parasite | Dose mg./kg. animal | Percentage effect |
|---|---|---|---|---|
| $IV_{19}$ | $(C_2H_5O)_2\overset{S}{\underset{\|}{P}}$ — $O$ — $N$ = $\overset{CN}{\underset{\|}{C}}$ — phenyl | *Capaillaria obsignata* | 1<br>2<br>3<br>5 | <50<br>85<br>>95<br>100 |

EXAMPLE O

The extremely low toxicity of some of the compounds according to the present invention towards warm-blooded animals can be seen from the following table:

TABLE O

| Compound (constitution) | | Mean toxicity towards warm-blooded animals in mg./kg. animal ($DL_{50}$) | |
|---|---|---|---|
| | | Rats per os | Mice per os |
| $IV_{20}$ | $(C_2H_5O)_2\overset{S}{\underset{\|}{P}}$ — $O$ — $N$ = $\overset{CN}{\underset{\|}{C}}$ — phenyl | 6,000 | 1,000 |
| $III_9$ | $(CH_3O)_2\overset{S}{\underset{\|}{P}}$ — $O$ — $N$ = $\overset{CN}{\underset{\|}{C}}$ — phenyl | 2,500 | |
| $VII_{10}$ | $(C_2H_5O)_2\overset{O}{\underset{\|}{P}}$ — $O$ — $N$ = $\overset{CN}{\underset{\|}{C}}$ — phenyl | [1] 250 | 500 |
| $IX_6$ | $CH_3O$ — $\overset{S}{\underset{\|}{P}}$ — $O$ — $N$ = $\overset{CN}{\underset{\|}{C}}$ — phenyl, with $C_2H_5O$ | [2] 1,000 | |

Footnotes at end of table.

TABLE O—Continued
| Compound (constitution) | Mean toxicity towards warm-blooded animals in mg./kg. animal (DL$_{50}$) | |
| --- | --- | --- |
| | Rats per os | Mice per os |
| XXXVII$_1$ 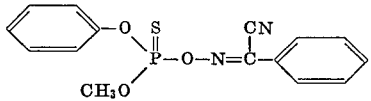 | 10 | |
| XXXII$_3$ 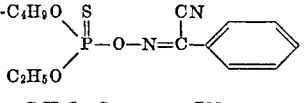 | 1,000 | |
| XXXVIII$_1$ 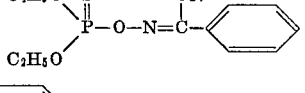 | 100 | |
| XLIV$_1$ 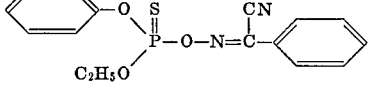 | 1,000 | |
| X$_{12}$ 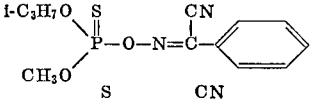 | 100 | |
| XXI$_4$ 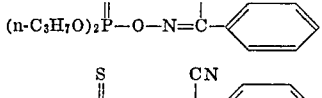 | 1,000 | |
| XX$_7$ 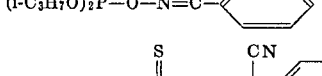 | 500 | |
| XXXVI$_2$ 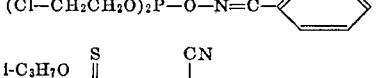 | [1] 500 | |
| XII$_9$ 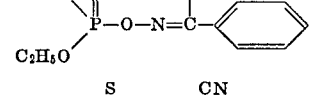 | 50-75 | 100 |
| XXX$_2$ 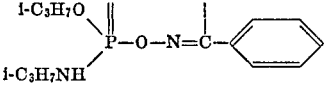 | 25 | |
| V$_5$ 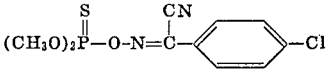 | [2] 1,000 | |
| VI$_{10}$ 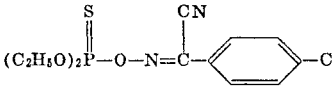 | 100 | |
| XI$_5$ 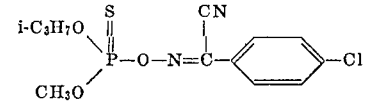 | [1] 100 | 10 |
| XVIII$_{10}$ 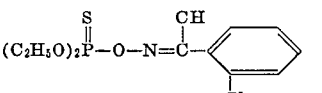 | [2] 1,000 | |
| XIX$_8$ 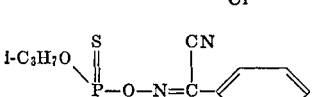 | [1] 100 | 25 |
| XXIII$_3$ 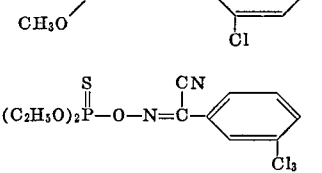 | [2] 1,000 | |
Footnotes at end of table.

TABLE O—Continued

| Compound (constitution) | | Mean toxicity towards warm-blooded animals in mg./kg. animal (DL$_{50}$) | |
|---|---|---|---|
| | | Rats per os | Mice per os |
| XXIV$_5$ | $(C_2H_5O)_2\overset{S}{\overset{\|}{P}}-O-N=\overset{CN}{\overset{\|}{C}}-\underset{Cl}{\overset{Cl}{\bigcirc}}$ | 1,000 | |
| XXXIII$_2$ | $(C_2H_5O)_2\overset{S}{\overset{\|}{P}}-O-N=\overset{CN}{\overset{\|}{C}}-\bigcirc-Cl$ (with Cl) | 500 | |
| XIV$_9$ | $\overset{C_2H_5}{\underset{C_2H_5O}{\diagdown}}\overset{S}{\overset{\|}{P}}-O-N=\overset{CN}{\overset{\|}{C}}-\bigcirc$ | 250 | 50 |
| XXXIV$_2$ | $\overset{CH_3}{\underset{C_2H_5O}{\diagdown}}\overset{S}{\overset{\|}{P}}-O-N=\overset{CN}{\overset{\|}{C}}-\bigcirc$ | 250 | |
| XXXIX$_1$ | $\bigcirc-\underset{CH_3O}{\overset{S}{\overset{\|}{P}}}-O-N=\overset{CN}{\overset{\|}{C}}-\bigcirc$ | 500 | |
| XXII$_2$ | $\bigcirc-\underset{C_2H_5O}{\overset{S}{\overset{\|}{P}}}-O-N=\overset{CN}{\overset{\|}{C}}-\bigcirc$ | 250 | |
| XL$_1$ | $(C_2H_5O)_2\overset{S}{\overset{\|}{P}}-O-N=\overset{CN}{\overset{\|}{C}}-\bigcirc_N$ | 25 | |
| XLI$_2$ | $(n-C_3H_7O)_2\overset{S}{\overset{\|}{P}}-O-N=\overset{CN}{\overset{\|}{C}}-\bigcirc_N$ | 250 | |
| XXVIII$_3$ | $(C_3H_7O)_2\overset{S}{\overset{\|}{P}}-O-N=\overset{CN}{\overset{\|}{C}}-\bigcirc\bigcirc$ | [2] 1,000 | |

[1] Approximately.
[2] No findings.

The outstanding activity of the compounds of the present invention against a variety of pests affecting hygiene and stored goods can be seen from the following examples of use P to T:

EXAMPLE P

LD$_{100}$ test

Test animals:
    *Dermestes frischi, Trogoderma granarium, Tribolium castaneum, Sitophilus zeamais* and *Aconthoscelides obtectus; Blatella germanica, Periplaneta americana* and *Leucophaea madeirae; Rhodnius prolixus; Ornithodoros moubata*

Solvent:
    Acetone 2 parts by weight of the active compound are dissolved in 1000 parts by volume of the solvent. The solution thus obtained is diluted with a further amount of solvent to the desired concentration.

2.5 ml. of the solution of the active compound are transferred to a petri dish by means of a pipette, a filter paper of about 9.5 cm. diameter being on the bottom of the petri dish. The petri dish is left uncovered until the solvent has completely evaporated. The amount of active compound per square metre of filter paper varies with the concentration of the solution of active compound used. About 25 test animals (3 to 10 in the case of the large species) are subsequently placed in the petri dish, which is then covered with a glass lid.

The condition of the test animals is observed one day and three days after the start of the test. The knock down effect is determined as a percentage.

The active compound, its concentrations, the test animals used and the results obtained can be seen from the following table:

2.5 ml. of the solution of the active compound are transferred to a petri dish by means of a pipette, a filter paper of about 9.5 cm. diameter being on the bottom of the petri dish. The petri dish is left uncovered until the solvent has completely evaporated. The amount of active compound per square metre of filter paper varies with

TABLE P.—$LD_{100}$ TEST

| Active compound | | Test animal | Concentration of active comp. in the solution, percent | Knock down effect, percent after— | |
|---|---|---|---|---|---|
| | | | | 24 hours | 72 hours |
| $IV_{21}$ | $(C_2H_5O)_2\overset{S}{\underset{\|}{P}}-O-N=\overset{CN}{\underset{\|}{C}}-\text{C}_6\text{H}_5$ | Dermestes frischi | 0.2 / 0.02 / 0.002 | 100 / 100 / 60 | 100 / 100 / 95 |
| | | Dermestes frischi larvae | 0.2 / 0.02 / 0.0002 | 100 / 95 / 20 | 100 / 100 / 65 |
| | | Trogoderma granarium | 0.2 / 0.02 / 0.002 / 0.0002 | 100 / 100 / 100 / 40 | 100 / 100 / 100 / 60 |
| | | Trogoderma granarium larvae | 0.2 / 0.02 / 0.002 | 100 / 100 / 90 | 100 / 100 / 100 |
| | | Tribolium castaneum | 0.2 / 0.02 / 0.002 | 100 / 100 / 90 | 100 / 100 / 100 |
| | | Sitophilus zeamais | 0.2 / 0.02 / 0.002 | 100 / 100 / 100 | 100 / 100 / 100 |
| | | Acanthoscelides obtectus | 0.2 / 0.02 / 0.002 / 0.0002 | 100 / 100 / 100 / — | 100 / 100 / 100 / 80 |
| | | Blatella germanica | 0.2 / 0.02 / 0.002 | 100 / 100 / 30 | 100 / 100 / 80 |
| | | Periplaneta americana | 0.2 / 0.02 | 100 / 100 | 100 / 100 |
| | | Leucophaea madeirae | 0.2 / 0.02 | 100 / 80 | 100 / 100 / 0 |
| | | Rhodnius prolixus | 0.2 / 0.02 / 0.002 / 0.0002 | 100 / 100 / 95 / — | 100 / 100 / 100 / 6 |
| | | Ornithodoros moubata | 0.2 / 0.02 | 50 / — | 100 / 100 |

EXAMPLE Q

$LD_{100}$ test

Test animals: *Sitopilus granarius*
Solvent: acetone 2 parts by weight of the active compound are dissolved in 1000 parts by volume of the solvent. The solution thus obtained is diluted with a further amount of solvent to the desired concentration.

the concentration of the solution of active compound used. About 25 test animals are subsequently placed in the petri dish, which is then covered with a glass lid.

The condition of the test animals is observed one day and three days after the start of the test. The knock down effect is determined as a percentage.

The active compounds, their concentrations, the test animals used and the results obtained can be seen from the following table:

TABLE Q.—$LD_{100}$ TEST

| Active compound | | Test animal | Concentration of active comp. in the solution, percent | Knockdown effect, percent after— | |
|---|---|---|---|---|---|
| | | | | 24 hours | 72 hours |
| $XIV_{10}$ | $\underset{C_2H_5}{\overset{C_2H_5O}{>}}\overset{S}{\underset{\|}{P}}-O-N=\overset{CN}{\underset{\|}{C}}-C_6H_5$ | Sitophilus granarius | 0.2 / 0.02 / 0.002 | — / — / — | 100 / 100 / 100 |
| $XLII_1$ | $\underset{C_2H_5}{\overset{iso-C_3H_7O}{>}}\overset{S}{\underset{\|}{P}}-O-N=\overset{CN}{\underset{\|}{C}}-C_6H_5$ | Sitophilus granarius | 0.2 / 0.02 / 0.002 | — / — / — | 100 / 100 / 100 |
| $VI_{11}$ | $(C_2H_5O)_2\overset{S}{\underset{\|}{P}}-O-N=\overset{CN}{\underset{\|}{C}}-C_6H_4-Cl$ | Sitophilus granarius | 0.2 / 0.02 / 0.002 | — / — / — | 100 / 100 / 80 |
| $V_6$ | $(CH_3O)_2\overset{S}{\underset{\|}{P}}-O-N=\overset{CN}{\underset{\|}{C}}-C_6H_4-Cl$ | Sitophilus granarius | 0.2 / 0.02 / 0.002 | — / — / — | 100 / 100 / 90 |

TABLE Q.—Continued

| Active compound | Test animal | Concentration of active comp. in the solution, percent | Knockdown effect, percent after— 24 hours | 72 hours |
|---|---|---|---|---|
| XIX$_9$ ..... iso-$C_3H_7O$ \ $\overset{S}{\underset{\|}{P}}$-O-N=$\overset{CN}{\underset{\|}{C}}$-[phenyl-Cl] / $CH_3O$ | Sitophilus granarius | 0.2 / 0.02 / 0.002 | ---------- / ---------- / ---------- | 100 / 100 / 100 |
| XVIII$_{11}$ ..... $(C_2H_5O)_2\overset{S}{\underset{\|}{P}}$-O-N=$\overset{CN}{\underset{\|}{C}}$-[phenyl-Cl] | Sitophilus granarius | 0.2 / 0.02 / 0.002 | ---------- / ---------- / ---------- | 100 / 100 / 100 |
| XXXIV$_3$ ..... $C_2H_5O$ \ $\overset{S}{\underset{\|}{P}}$-O-N=$\overset{CN}{\underset{\|}{C}}$-[phenyl] / $CH_3$ | Sitophilus granarius | 0.2 / 0.02 / 0.002 | ---------- / ---------- / ---------- | 100 / 100 / 100 |
| IX$_7$ ..... $CH_3O$ \ $\overset{S}{\underset{\|}{P}}$-O-N=$\overset{CN}{\underset{\|}{C}}$-[phenyl] / $C_2H_5O$ | Sitophilus granarius | 0.2 / 0.02 / 0.002 / 0.0002 | ---------- / ---------- / ---------- / ---------- | 100 / 100 / 100 / 70 |
| XV$_5$ ..... $C_2H_5O$ \ $\overset{O}{\underset{\|}{P}}$-O-N=$\overset{CN}{\underset{\|}{C}}$-[phenyl] / $C_2H_5$ | Sitophilus granarius | 0.2 / 0.02 / 0.002 | ---------- / ---------- / ---------- | 100 / 100 / 80 |
| XVI$_3$ ..... $(C_2H_5O)_2\overset{S}{\underset{\|}{P}}$-O-N=$\overset{CN}{\underset{\|}{C}}$-[phenyl-$SCH_3$] | Sitophilus granarius | 0.2 / 0.02 | ---------- / ---------- | 100 / 100 |
| IV$_{22}$ ..... $(C_2H_5O)_2\overset{S}{\underset{\|}{P}}$-O-N=$\overset{CN}{\underset{\|}{C}}$-[phenyl] | Sitophilus granarius | 0.2 / 0.02 / 0.002 | 100 / 100 / 95 | 100 / 100 / 100 |

EXAMPLE R

LT$_{100}$ test for Diptera

Test animals: *Musca domestica*
Solvent: acetone 2 parts by weight of active compound are dissolved in 1000 parts by volume of solvent. The resultant solution is diluted with a further amount of solvent to the desired lower concentration.

2.5 ml. of the solution of active compound are transferred to a petri dish by means of a pipette, a filter paper of about 9.5 cm. diameter being on the bottom of the petri dish. The petri dish is left uncovered until the solvent has completely evaporated. The amount of active compound per square metre of filter paper varies with the concentration of the solution of active compound used. About 25 test animals are then placed in the petri dish which is covered with a glass lid.

The condition of the test animals is continuously observed. The period of time required for 100% knock down effect is determined.

The test animals, the active compounds, their concentrations and the periods of time which bring about a 100% knock down effect, can be seen from the following table:

TABLE R.—LT$_{100}$ TEST FOR DIPTERA

| Active compound | Test animal | Concentration of active comp. in the solution, percent | LT$_{100}$, minutes |
|---|---|---|---|
| IV$_{23}$ ..... $(C_2H_5O)_2\overset{S}{\underset{\|}{P}}$-O-N=$\overset{CN}{\underset{\|}{C}}$-[phenyl] | Musca domestica | 0.2 / 0.02 / 0.002 | 95 / 040 / (1) |
| XIV$_{10}$ ..... $C_2H_5O$ \ $\overset{S}{\underset{\|}{P}}$-O-N=$\overset{CN}{\underset{\|}{C}}$-[phenyl] / $C_2H_5$ | Musca domestica | 0.2 / 0.02 / 0.002 / 0.0002 | 50 / 90 / 165 / 220 |
| X$_{13}$ ..... iso-$C_3H_7O$ \ $\overset{S}{\underset{\|}{P}}$-O-N=$\overset{CN}{\underset{\|}{C}}$-[phenyl] / $CH_3O$ | Musca domestica | 0.2 / 0.02 / 0.002 | 60 / 185 / (2) |
| XXXIV$_4$ ..... $C_2H_5O$ \ $\overset{S}{\underset{\|}{P}}$-O-N=$\overset{CN}{\underset{\|}{C}}$-[phenyl] / $CH_3$ | Musca domestica | 0.2 / 0.02 / 0.002 | 25 / 55 / 105 |
| IX$_8$ ..... $C_2H_5O$ \ $\overset{S}{\underset{\|}{P}}$-O-N=$\overset{CN}{\underset{\|}{C}}$-[phenyl] / $CH_3O$ | Musca domestica | 0.2 / 0.02 / 0.002 | 45 / 135 / (2) |

[1] 8 hours, nearly equal to 70%.
[2] 8 hours, nearly equal to 50%.

EXAMPLE S

LT$_{100}$ test for Diptera

Test animals: *Aedes aegypti*
Solvent: actone 2 parts by weight of active compound are dissolved in 1000 parts by volume of solvent. The resultant solution is diluted with a further amount of solvent to the desired lower concentration.

2.5 ml. of the solution of active compound are transferred to a petri dish by means of a pipette, a filter paper of about 9.5 cm. diameter being on the bottom of the petri dish. The petri dish is left uncovered until the solvent has completely evaporated. The amount of active compound per square metre of filter paper varies with the concentration of the solution of active compound used. About 25 test animals are then placed in the petri dish which is covered with a glass lid.

The condition of the test animals is continuously observed. The period of time required for a 100% knock down effect is determined.

The test animals, the active compounds, their concentrations and the periods of time which bring about a 100% knock down effect, can be seen from the following table:

EXAMPLE T

Mosquito larvae test

Test animals: larvae of *Aedes aegypti*
Solvent: 99 parts by weight acetone
Emulsifier: 1 part by weight benzyl hydroxydiphenyl polyglycol ether To produce a suitable preparation of active compound, 2 parts by weight of the active compound are dissolved in 1000 parts by volume of the solvent containing the stated amount of emulsifier. The solution so obtained is diluted with water to the desired lower concentration.

The aqueous preparations of the active compound are placed in glass vessels and 25 mosquito larvae are then placed in each glass vessel.

After 24 hours, the degree of destruction is determined as a percentage: 100% means that all the larvae are killed, whereas 0% means that none are killed.

The active compounds, their concentrations, the test animals and the results obtained can be seen from the following table:

TABLE S.—LT$_{100}$ TEST FOR DIPTERA

| Active compound | Test animal | Concentration of active comp. in the solution, percent | LT$_{100}$, minutes |
|---|---|---|---|
| XII$_{10}$ iso-C$_3$H$_7$O, C$_2$H$_5$O — P(S) — O — N=C(CN) — C$_6$H$_5$ | *Aedes aegypti* | 0.2 / 0.02 / 0.002 | 60 / 120 / 180 |
| IV$_{24}$ (C$_2$H$_5$O)$_2$P(S) — O — N=C(CN) — C$_6$H$_5$ | *Aedes aegypti* | 0.2 / 0.02 / 0.002 / 0.0002 | 60 / 120 / 180 / (¹) |
| XVI$_4$ (C$_2$H$_5$O)$_2$P(S) — O — N=C(CN) — C$_6$H$_4$ — SCH$_3$ | *Aedes aegypti* | 0.2 / 0.02 | 60 / 120 |
| XVIII$_{12}$ (C$_2$H$_5$O)$_2$P(S) — O — N=C(CN) — C$_6$H$_4$ — Cl | *Aedes aegypti* | 0.2 / 0.02 | 120 / 120 |
| XIV$_{11}$ C$_2$H$_5$O, C$_2$H$_5$ — P(S) — O — N=C(CN) — C$_6$H$_5$ | *Aedes aegypti* | 0.2 / 0.02 / 0.002 | 60 / 60 / (²) |
| XX$_8$ (iso-C$_3$H$_7$O)$_2$P(S) — O — N=C(CN) — C$_6$H$_5$ | *Aedes aegypti* | 0.2 / 0.02 | 120 / 120 |

[1] 3 hours, nearly equal to 60%.
[2] 3 hours, nearly equal to 70%.

TABLE T.—MOSQUITO LARVAE TEST

| Active compound | Test animal | Concentration of active comp. in the solution, percent | Degree of destruction, percent |
|---|---|---|---|
| IV$_{25}$ (C$_2$H$_5$O)$_2$P(S) — O — N=C(CN) — C$_6$H$_5$ | Larvae of *Aedes aegypti* in the 5th stage. | 0.001 / 0.0001 / 0.00001 / 0.000001 | 100 / 100 / 100 / 90 |
| XIV$_{12}$ C$_2$H$_5$O, C$_2$H$_5$ — P(S) — O — N=C(CN) — C$_6$H$_5$ | do | 0.000001 | 100 |
| X$_{11}$ iso-C$_3$H$_7$O, CH$_3$O — P(S) — O — N=C(CN) — C$_6$H$_5$ | do | 0.000001 | 100 |

TABLE T.—Continued

| Active compound | | Test animal | Concentration of active comp. in the solution, percent | Degree of destruction, percent |
|---|---|---|---|---|
| VI$_{12}$ | (C$_2$H$_5$O)$_2$P(S)—O—N=C(CN)—C$_6$H$_4$—Cl | ...do... | 0.000001 / 0.0000001 | 100 / 50 |
| XXI$_5$ | (n-C$_3$H$_7$O)$_2$P(S)—O—N=C(CN)—C$_6$H$_5$ | ...do... | 0.000001 / 0.0000001 | 100 / 30 |
| XXX$_3$ | (iso-C$_3$H$_7$O)(iso-C$_3$H$_7$HN)P(S)—O—N=C(CN)—C$_6$H$_5$ | ...do... | 0.000001 / 0.0000001 | 100 / 30 |
| XII$_{11}$ | (iso-C$_3$H$_7$O)(C$_2$H$_5$O)P(S)—O—N=C(CN)—C$_6$H$_5$ | ...do... | 0.000001 / 0.0000001 | 100 / 40 |
| V$_7$ | (CH$_3$O)$_2$P(S)—O—N=C(CN)—C$_6$H$_4$—Cl | ...do... | 0.00001 | 100 |
| XIX$_{10}$ | (iso-C$_3$H$_7$O)(CH$_3$O)P(S)—O—N=C(CN)—C$_6$H$_4$—Cl | ...do... | 0.000001 | 100 |
| XVIII$_{13}$ | (C$_2$H$_5$O)$_2$P(S)—O—N=C(CN)—C$_6$H$_4$—Cl | ...do... | 0.000001 | 100 |
| XXXIX$_2$ | (CH$_3$O)(C$_6$H$_5$)P(S)—O—N=C(CN)—C$_6$H$_5$ | ...do... | 0.000001 | 100 |
| XXII$_3$ | (C$_2$H$_5$O)(C$_6$H$_5$)P(S)—O—N=C(CN)—C$_6$H$_5$ | ...do... | 0.00001 / 0.000001 | 100 / 30 |
| XLIII$_1$ | (CH$_3$O)(C$_2$H$_5$)P(S)—O—N=C(CN)—C$_6$H$_5$ | ...do... | 0.000001 / 0.0000001 | 100 / 50 |
| XIII$_4$ | (sec.-C$_4$H$_9$O)(CH$_3$O)P(S)—O—N=C(CN)—C$_6$H$_5$ | ...do... | 0.00001 / 0.000001 | 100 / 95 |
| VIII$_3$ | (C$_6$H$_{11}$O)(CH$_3$O)P(S)—O—N=C(CN)—C$_6$H$_5$ | ...do... | 0.00001 / 0.000001 | 100 / 40 |
| XXXII$_4$ | (n-C$_4$H$_9$O)(C$_2$H$_5$O)P(S)—O—N=C(CN)—C$_6$H$_5$ | ...do... | 0.000001 | 100 |
| XLIV$_2$ | (C$_6$H$_5$O)(C$_2$H$_5$O)P(S)—O—N=C(CN)—C$_6$H$_5$ | ...do... | 0.00001 / 0.000001 | 100 / 90 |
| XXIV$_6$ | (C$_2$H$_5$O)$_2$P(S)—O—N=C(CN)—C$_6$H$_3$Cl$_2$ | ...do... | 0.000001 | 100 |

TABLE T.—Continued

| Active compound | | Test animal | Concentration of active comp. in the solution, percent | Degree of destruction, percent |
|---|---|---|---|---|
| XXVIII$_4$ | $(C_2H_5O)_2\overset{S}{\overset{\|}{P}}-O-N=\overset{CN}{\overset{\|}{C}}$-naphthyl | do | 0.00001 | 100 |
| XXVI$_3$ | $(C_2H_5O)_2\overset{S}{\overset{\|}{P}}-O-N=\overset{CN}{\overset{\|}{C}}-C_6H_4-NO_2$ | do | 0.0001<br>0.00001 | 100<br>60 |
| XXIX$_4$ | $(C_2H_5O)_2\overset{S}{\overset{\|}{P}}-O-N=\overset{CN}{\overset{\|}{C}}-C_6H_4-OCH_3$ | do | 0.0001 | 100 |

The following examples are given for the purpose of illustrating the present invention:

EXAMPLE 1

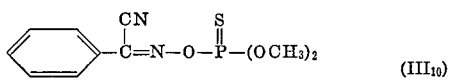
(III$_{10}$)

61 games (0.36 mol) of the sodium salt of α-oximino-phenylacetic acid nitrile (prepared according to M. R. Zimmermann, Journal für praktische Chemi (2), 66, 359/1902) are suspended in 150 cc. acetone, 48 grams (0.3 mol) O,O-dimethyl-thionophosphoric acid ester chloride are added dropwise to this suspension. An exothermic reaction commences. The temperature of the mixture is kept at 25 to 30° C. by cooling with ice-water. After stirring for one hour, the reaction mixture is poured into water and the precipitated oil is taken up with benzene. The benzene solution is washed with water and a 2 N sodium hydroxide solution to remove the unreacted α-oximino-phenylacetic acid nitrile and subsequently dried over anhydrous sodium sulphate. After distilling off the solvent, 75 g. (92.5% of theory) O,O-dimethylthiono-phosphoryl-α-oximino-phenylacetic acid nitrile are obtained in the form of an orange-yellow oil of refractive index $n^{22}$ 1.5528.

Analysis.—Calculated for a molecular weight of 270.3: P, 11.46%; S, 11.86%; N, 10.36%. Found: P, 11.30%; S, 11.61%; N, 10.29%.

EXAMPLE 2

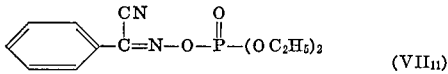
(VII$_{11}$)

52 grams (0.3 mol) O,O-diethyl-phosphoric acid ester chloride are added dropwise at 25 to 30° C., while cooling, to a suspension of 61 g. (0.36 mol) of the sodium salt of α-oximino-phenylacetic acid nitrile in 150 cc. acetone and, after stirring for one hour, the mixture is poured into water. The pricipitated oil is extracted by shaking with benzene, the benzene solution is washed with water and a 2 N sodium hydroxide solution, dried over anhydrous sodium sulphate and the solvent distilled off under reduced pressure. 78 grams (94% of theory) O,O-diethyl-phosphoryl - α - oximino-phenylacetic acid nitrile are obtained in the form of a yellowish oil of refractive index $n^{22}$ 1.5150.

Analysis.—Calculated for a molecular weight of 282.3: P, 10.00%; N, 9.92%. Found: P, 10.89%; N, 9.82%.

EXAMPLE 3

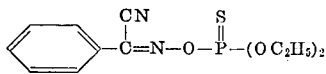
(IV$_{26}$)

(a) 61 grams (0.36 mol) of the sodium salt of α-oximinophenylacetic acid nitrile are suspended in 280 cc. acetone and 57 g. (0.3 mol) O,O-diethyl-thionophosphoric acid ester chloride are added dropwise to this suspension at 30 to 35° C., while cooling. After stirring the mixture for one hour it is poured into water, the precipitated oil is taken up with benzene, the benzene solution washed with water and a 2 N sodium hydroxide solution, the organic phase dried over anhydrous sodium sulphate and the solvent distilled off. As the residue there are obtained 85 g. (95.5% of theory) O,O-diethyl-thionophosphoryl-α-oximino-phenylacetic acid nitrile in the form of a pale yellow oil of refractive index $n^{22}$ 1.5395 and density $\gamma^{20}$ 1.176 g./cc. The compound can only be distilled in small amounts, even under strongly reduced pressure, and then boils at 102° C./0.01 mm. Hg.

Analysis.—Calculated for a molecular weight of 298.3: P, 10.38%; S, 10.75%; N, 9.39. Found: P, 10.38%; S, 10.65%; N, 9.25%.

(b) 28.5 grams (0.154 mol) O,O-diethyl-thionophosphoric acid ester chloride are rapidly added dropwise to a solution of 28.5 g. (0.169 mol) of the sodium salt of α-oximino-phenylacetic acid nitrile in 140 cc. water. The reaction temperature rises from 20 to 27° C. in the course of 2 hours. Stirring of the mixture is continued for 20 hours in order to complete the reaction. The precipitated oil is subsequently taken up with benzene and the benzene solution worked up as described under (a). The yield of O,O-diethylthionophosphoryl-α-oximino-phenylacetic acid nitrile is 40 g. (87.2% of theory) and the refractive index $n^{22}$ is 1.5381.

Analysis.—Calculated for a molecular weight of 298.3: P, 10.38%; S, 10.75%; N, 9.39%. Found: P, 10.66%; S, 10.76%; N, 9.38.

(c) 70 grams (0.48 mol) α-oximino-phenylacetic acid nitrile (M.P. 129 to 130° C.) are dissolved in 500 cc. acetone, 79 g. (0.57 mol) finely-powdered potassium carbonate are introduced, the mixture is subsequently further stirred for 30 minutes and then mixed dropwise, while cooling, with 76 g. (0.4 mol) O,O-diethyl-thionophosphoric acid ester chloride. The reaction mixture is subsequently further stirred for one hour, then poured into water and worked up as described under (a). The yield of O,O-diethyl-thionophosphoryl-α-oximino-phenylacetic acid nitrile is 105 g. (89.5% of theory). The refractive index $n^{23}$ is 1.5402.

Analysis.—Calculated for a molecular weight of 298.3: P, 10.38%; S, 10.75%; N, 9.39%. Found: P, 10.56%; S, 10.85%; N, 9.33%.

(d) 46 grams (0.31 mol) α-oximino-phenylacetic acid nitrile (M.P. 129 to 130° C.) are dissolved in 300 cc. benzene. 42 grams (0.39 mol) of 95% triethylamine are added dropwise to this solution at 20 to 25° C., while cooling, and the mixture is subsequently treated dropwise at 25 to 30° C., while slightly cooling, with 49 g. (0.26 mol) O,O-diethyl-thionophosphoric acid ester chloride and then further stirred at room temperature for 4 hours. The precipitated triethyl ammonium hydrochloride is filtered off with suction and the filtrate washed several times with water. After drying the organic phase over anhydrous sodium sulphate and distilling off the solvent, 72 g. O,O-diethyl-thionophosphoryl-α-oximinophenylacetic acid nitrile remain as a reddish-yellow oil of refractive index $n^{22}$ 1.5412.

(e) 152 grams (0.6 mol) of the silver salt of α-oximinophenylacetic acid nitrile (prepared according to M. R. Zimmermann, Journal für praktische Chemie (2), 66, 364/1902) or A. Meyer, Berichte der deutschen chem. Gesellschaft, 21, 1315 (1888) are suspended in 1 litre ether and 95 g. (0.5 mol) O,O-diethyl-thionophosphoric acid ester chloride are added dropwise to this suspension at 20 to 25° C., while cooling. After stirring the mixture for one hour, the precipitated silver chloride is filtered off with suction, the ether solution is washed with water and a 2 N sodium hydroxide solution and dried over anhydrous magnesium sulphate. After distilling off the solvent, 145 g. (97% of theory), O,O-diethyl-thionophosphoric acid-α-oximino-phenylacetic acid nitrile remain in the form of an almost colourless oil of refractive index $n^{22}$ 1.5421.

*Analysis.*—Calculated for a molecular weight of 298.3: P, 10.38%; S, 10.75%; N, 9.39%. Found: P, 10.42%; S, 10.75%; N, 9.45%.

(f) 53 grams (0.272 mol) O,O-diethyl-thionophosphoric acid ester chloride are added dropwise at room temperature to a suspension of 72 g. (0.1675 mol) of the barium salt of α-oximino-phenylacetic acid nitrile in 800 cc. acetone and the mixture is subsequently stirred overnight. The precipitated barium chloride is filtered off with suction, the solvent distilled off, the precipitated oil taken up with benzene, the benzene solution washed with water and a 2 N sodium hydroxide solution and finally again with water until the reaction is neutral. The organic layer is then dried over anhydrous sodium sulphate and the benzene distilled off. There remain 67 g. (79.4% of theory) of a yellowish oil of refractive index $n^{21}$ 1.5434.

*Analysis.*—Calculated for a molecular weight of 298.3 (percent): P, 10.38; S, 10.75; N, 9.39. Found (percent): P, 10.35; S, 10.85; N, 9.19.

(g) 60 grams (0.41 mol) α-oximino-phenylacetic acid nitrile (M.P. 103 to 104° C. from benzene; cf. L. Cambi, A. Cagnasso and T. Ricci, Gazzeta chimica italiana, 61, 10/1931) are dissolved in 400 cc. acetone. After introducing 67 g. (0.48 mol) finely-powdered potassium carbonate, the mixture is stirred for 30 minutes and then treated dropwise at 25 to 30° C., while cooling, with 64.5 g. (0.34 mol) O,O-diethyl-thionophosphoric acid ester chloride. The reaction mixture is subsequently further stirred for one hour, poured into water and worked up as described under (a). The yield of O,O-diethyl-thionophosphoryl-α - oximinophenylacetic acid nitrile is 92 g. (91% of theory) and the refractive index $n^{21.5}$ is 1.5416.

The following compounds can be prepared in a manner analogous to that described in Example 3(a):

| Constitution | | Physical properties | Yield (percent of theory) |
|---|---|---|---|
| IX₉ | Ph-C(CN)=N-O-P(=S)(OCH₃)(OC₂H₅) | $n^{23}$ 1.5480 | 88.5 |
| XXI₆ | Ph-C(CN)=N-O-P(=S)(OC₃H₇ₙ)₂ | $n^{20}$ 1.5330; $\gamma^{20}$ 1.138 g./cc. | 78.0 |
| XX₉ | Ph-C(CN)=N-O-P(=S)(OC₃H₇-i)₂ | $n^{20}$ 1.5338 | 75.0 |
| X₁₅ | Ph-C(CN)=N-O-P(=S)(OC₃H₇-i)(OCH₃) | M.P. 60–64°C | 85.5 |
| XII₁₂ | Ph-C(CN)=N-O-P(=S)(OC₃H₇-i)(OC₂H₅) | $n^{20}$ 1.5398 | 78.0 |
| XXXII₅ | Ph-C(CN)=N-O-P(=S)(OC₄H₉-n)(OC₂H₅) | $n^{23}$ 1.5256 | 86.0 |
| XXV₂ | Ph-C(CN)=N-O-P(=S)(OC₆H₁₃-n)(OC₂H₅) | $n^{20}$ 1.5259 | 89.0 |
| XXXVIII₂ | Ph-C(CN)=N-O-P(=S)(OC₄H₉-sec.)(OC₂H₅) | $n^{23}$ 1.5382 | 86.0 |
| XXXVII₂ | Ph-C(CN)=N-O-P(=S)(O-Ph)(OCH₃) | $n^{23}$ 1.5549 | 74.5 |
| XLIV₃ | Ph-C(CN)=N-O-P(=S)(O-Ph)(OC₂H₅) | $n^{23}$ 1.5798 | 74.5 |

TABLE—Continued

| Constitution | | Physical properties | Yield (percent of theory) |
|---|---|---|---|
| XXXVI₃ | 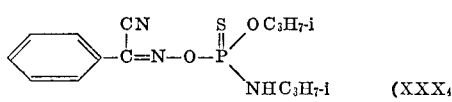 | $n^{22}$ 1.5658 | 99 |

EXAMPLE 4

$$\text{C}_6\text{H}_5-\underset{\underset{\text{CN}}{|}}{\text{C}}=\text{N}-\text{O}-\underset{\underset{\text{NHC}_3\text{H}_7\text{-i}}{|}}{\overset{\overset{\text{S}}{\|}}{\text{P}}}-\text{OC}_3\text{H}_7\text{-i} \quad (XXX_4)$$

81 grams (0.48 mol) of the sodium salt of α-oximino-phenylacetic acid nitrile are suspended in 500 cc. aceto-nitrile, 86 g. (0.4 mol) O-isopropyl-N-monoisopropyl-amido-thionophosphoric acid chloride are added dropwise to this suspension at not more than 30° C., while cooling, the mixture is stirred for one hour, then poured into water, and the precipitated oil is taken up with benzene. The benzene solution is washed with water and a 2 N sodium hydroxide solution, the organic phase dried over anhydrous sodium sulphate and the solvent removed under reduced pressure. As the residue there remains O-iso-propyl-N-monoisopropyl-thionophosphoryl-amido-α - oxi-mino-phenylacetic acid nitrile in the form of a pale yellow viscous oil of refractive index $n^{22}$ 1.5432, which slowly crystallises and then melts at 35° C.

*Analysis.*—Calculated for a molecular weight of 325.4 (percent): P, 9.52; S, 9.85; N, 12.91. Found (percent): P, 9.46; S, 9.47; N, 12.89.

EXAMPLE 5

$$\text{Cl}-\text{C}_6\text{H}_4-\underset{\underset{\text{CN}}{|}}{\text{C}}=\text{N}-\text{O}-\overset{\overset{\text{S}}{\|}}{\text{P}}-(\text{OCH}_3)_2 \quad (V_8)$$

73 grams (0.36 mol) of the sodium salt of α-oximino-4-chlorophenyl-acetic acid nitrile (prepared according to M. R. Zimmermann, Journal für praktische Chemie (2), 66, 373/1902) are suspended in 400 cc. acetone. 48 grams (0.3 mol) O,O-dimethyl-thionophosphoric acid ester chloride are added dropwise to this suspension at 25 to 30° C., while cooling. After stirring for one hour, the mixture is poured into water and the precipitated oil taken up with benzene. The benzene solution is washed with water and 2 N sodium hydroxide solution, dried over anhydrous sodium sulphate and the solvent distilled off under reduced pressure. The residue after distillation, is cooled to 0° C., triturated with petroleum ether, the crystallisate is filtered off with suction and recrystallised from a mixture of ether and petroleum ether, the O,O-dimethyl-thionophosphoryl-α-oximino-4-chlorophenyl-acetic acid nitrile being thus obtained in the form of coarse colourless crystals of melting point 47° C. The yield is 48 g. (52.5% of theory).

*Analysis.*—Calculated for a molecular weight of 304.7 (percent): Cl, 11.64; S, 10.53; N, 9.20. Found (percent): Cl, 11.84; S, 10.95; N, 9.25.

The following compounds are obtained in analogous manner:

| Constitution | | Physical properties | Yield (percent of theory) |
|---|---|---|---|
| VI₁₃ | 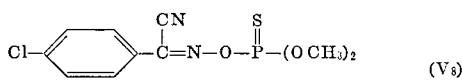 | $n^{25}$ 1.5498 | 74 |
| XI₆ | 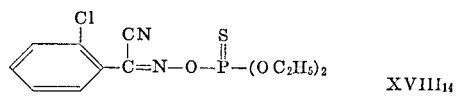 | $n^{23}$ 1.5544 | 83 |

EXAMPLE 6

$$\text{Cl}-\text{C}_6\text{H}_4-\underset{\underset{\text{CN}}{|}}{\text{C}}=\text{N}-\text{O}-\overset{\overset{\text{S}}{\|}}{\text{P}}-(\text{OC}_2\text{H}_5)_2 \quad XVIII_{14}$$

(a) 57 grams (0.3 mol) O,O-diethyl-thionophosphoric acid ester chloride are added dropwise at 20 to 30° C., while cooling, to a suspension of 85 g. (0.36 mol) of the sodium salt of α-oximino-2-chlorophenyl-acetic acid nitrile (prepared according to M. R. Zimmermann, Journal für praktische Chemie (2), 66, 377/1902) in 250 cc. acetone, and, after stirring for one hour, the mixture is poured into water. The precipitated oil rapidly solidifies in crystalline form. The crystallisate is filtered off with suction and washed with water. By recrystallisation from a mixture of ether and petroleum ether, O,O-diethyl-thio-nophosphoryl-α-oximino-2-chlorophenyl-acetic acid nitrile is obtained in the form of heavy, colourless crystals of melting point 64° C. The yield is 90 g. (90% of theory).

*Analysis.*—Calculated for a molecular weight of 332.8: P, 9.30%; N, 8.41%; Cl, 10.65%. Found: P, 9.65%; N, 8.93%; Cl, 10.76%.

(b) 94 grams (0.5 mol) O,O-diethyl-thionophosphoric acid ester chloride are rapidly added dropwise to a solution of 122 g. (0.6 mol) of the sodium salt of α-oximino-2-chlorophenyl-acetic acid nitrile in 600 cc. water. The reaction temperature rises from 24 to 27° C. in the course of 3 hours. The mixture is subsequently further stirred for 20 hours to complete the reaction. The product, initially precipitated in oily form, thereby solidifies in crystalline form. The crystals are filtered off with suction and washed with petroleum ether. O,O-diethyl-thiono-phosphoryl-α-oximino-2-chlorophenyl-acetic acid nitrile is thus obtained in the form of fine, colourless crystals of melting point 65–66° C. The yield is 64.3% of theory.

The following compounds are obtained in the same manner by using the sodium salt of α-oximino-2-chlorophenyl-acetic acid nitrile and the appropriate ester chlorides:

57 grams (0.24 mol) of the sodium salt of α-oximino-2,6-dichlorophenyl-acetic acid nitrile are suspended in 250 cc. acetone, 38 g. (0.21 mol) O,O-diethyl-thionophosphoric acid ester chloride are added dropwise to this sus-

| | Constitution | Physical properties | Yield (percent of theory) |
|---|---|---|---|
| $XLV_1$ | Ar(Cl)–C(CN)=N–O–P(=O)(OCH$_3$)$_2$ | $n^{21}$ 1.5315 | 56.3 |
| $XLVI_1$ | Ar(Cl)–C(CN)=N–O–P(=S)(OCH$_3$)$_2$ | $n^{21}$ 1.5547 | 78.8 |
| $XLVII_1$ | Ar(Cl)–C(CN)=N–O–P(=O)(OCH$_{25}$)$_2$ | M.P. 52–53° C | 83.5 |
| $XLVIII_1$ | Ar(Cl)–C(CN)=N–O–P(=S)(OC$_2$H$_5$)(OCH$_3$) | $n^{21}$ 1.5508 | 91.8 |
| $XLIX_1$ | Ar(Cl)–C(CN)=N–O–P(=S)(OC$_3$H$_7$-n)$_2$ | $n^{21}$ 1.5295 | 73.0 |
| $L_1$ | Ar(Cl)–C(CN)=N–O–P(=S)(OC$_3$H$_7$-i)$_2$ | $n^{21}$ 1.5356 | 93.8 |
| $LI_1$ | Ar(Cl)–C(CN)=N–O–P(=S)(OC$_3$H$_7$-i)(OC$_2$H$_5$) | $n^{21}$ 1.5398 | 94.4 |
| $LII_1$ | Ar(Cl)–C(CN)=N–O–P(=S)(OC$_4$H$_9$-n)(OC$_2$H$_5$) | $n^{21}$ 1.5292 | 89.0 |
| $LIII_1$ | Ar(Cl)–C(CN)=N–O–P(=S)(O–CH$_2$–CH$_2$–Cl)$_2$ | $n^{21}$ 1.5641 | 84.5 |
| $LIV_1$ | Ar(Cl)–C(CN)=NO–P(=S)(C$_6$H$_5$)(OC$_2$H$_5$) | M.P. 63–64° C | 85.7 |
| $LV_1$ | Ar(Cl)–C(CN)=N–O–P(=S)(C$_2$H$_5$)(OCH$_3$) | $n^{21}$ 1.5657 | 77.5 |
| $LVI_1$ | Ar(Cl)–C(CN)=N–O–P(=S)(C$_2$H$_5$)(OC$_2$H$_5$) | $n^{21}$ 1.5641 | 84.5 |
| $XIX_{11}$ | Ar(Cl)–C(CN)=N–O–P(=S)(OC$_3$H$_7$-i)(OCH$_3$) | $n^{23}$ 1.5432 | 76.5 |

EXAMPLE 7

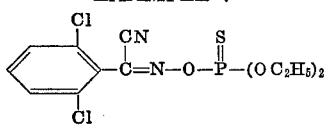

($XXIV_7$)

pension at not more than 30° C., while cooling, the mixture is subsequently stirred for 30 minutes and then poured into water which is changed several times, whereupon the reaction product solidifies in crystalline form. After mixing with petroleum ether, the crystallisate is filtered off with suction. The yield is 44 g. (72% of theory). By recrystallisation from a mixture of ether and petroleum ether, O,O - diethyl - thionophosphoryl - α - ox-imino-2,6-dichlorophenyl-acetic acid nitrile is obtained in the form of heavy, colourless crystals of melting point 58° C.

*Analysis.*—Calculated for a molecular weight of 367.2: N, 7.63%; Cl, 19.31%; S, 8.73%. Found: N, 7.55%; Cl, 19.31%; S, 8.95%.

The α-oximino-2,6-dichlorophenyl-acetic acid nitrile required as starting material can be obtained, for example, in the following manner: 242 g. (1.3 mol) 2,6-dichlorobenzyl cyanide (M.P. 75 to 76% C., prepared from 2,6-dichlorobenzyl chloride and potassium cyanide) are dissolved in 2 litres ether. After an amount of sodium methylate solution corresponding to 1.43 mol sodium has been added at 25 to 30° C., while cooling, 153 g. (1.3 mol) isoamyl nitrite are added dropwise to the reaction mixture at 20 to 25° C., while cooling. The mixture is stirred overnight and the solvents are distilled off. The residue is dissolved in plenty of water. The solution is shaken several times with methylene chloride to remove the unreacted 2,6-dichlorobenzyl cyanide. The α-oximino-2,6-dichlorophenyl-acetic acid nitrile is precipitated by acidification with a mineral acid. Recrystallisation from benzene yields colourless leaflets of melting point 156° C. The yield is 73 g. (25.3% of theory). The product obtained is presumably the corresponding anti-compound.

EXAMPLE 8

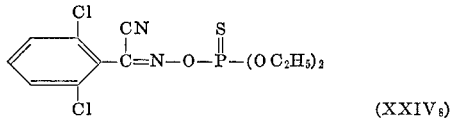

(XXIV$_6$)

78 grams (0.36 mol) α-cyano-2,6-dichloro-benzaldoxime (M.P. 118 to 120° C.; prepared in this manner described in Belgian patent specification No. 598,730 from α-2,6-trichlorobenzaldoxime and sodium cyanide; this is presumably the syn-compound) are dissolved in 400 cc. acetone. After introducing 60 g. (0.42 mol) finely-powdered potassium carbonate, the mixture is stirred at room temperature for 30 minutes, and 57 g. (0.3 mol) O,O-diethyl-thionophosphoric acid ester chloride are subsequently added dropwise to the reaction mixture at 25 to 30° C., while cooling. The mixture is subsequently further stirred for one hour, poured into water and the precipitated oil is taken up with benzene. After working up the mixture in the manner described in the preceding examples an oil is obtained, which solidifies in crystalline form when triturated with petroleum ether. O,O-diethyl-thionophosphoryl - α - oximino-2,6-dichlorophenyl-acetic acid nitrile is obtained in the form of yellowish crystals of melting point 34° C. The yield is 90 g. (82% of theory).

*Analysis.*—Calculated for a molecular weight of 367.2: N, 7.63%; Cl, 19.31%; S, 8.73%. Found: N, 7.69%; Cl, 19.06%; S, 9.04%.

The following compounds can also be prepared with the use of α-cyano-2,6-dichloro-benzaldoxime:

| | Constitution | Physical properties | Yield (percent of theory) |
|---|---|---|---|
| LVII$_1$ | ![structure with Cl, CN, C=N-O-P(=O)(OC$_2$H$_5$)$_2$, Cl] | $n^{27}$ 1.5394 | 60 |
| LVIII$_1$ | ![structure with Cl, CN, C=N-O-P(=O)(C$_2$H$_5$)(OC$_2$H$_5$), Cl] | $n^{27}$ 1.5223 | 68.5 |
| LIX$_1$ | ![structure with Cl, CN, C=N-O-P(=S)(phenyl)(OC$_2$H$_5$), Cl] | | 11.6 |

The following compounds are formed from α-oximino-3,4-dichlorophenyl-acetic acid nitrile (M.P. 116° C.) or α-oximino-trichlorophenyl-acetic acid nitrile (M.P. 168 to 169° C.) which are obtainable by known methods from the corresponding benzyl chlorides with sodium cyanide:

| | Constitution | Physical properties | Yield (percent of theory) |
|---|---|---|---|
| XXXIII$_3$ | ![Cl-phenyl-Cl with C=N-O-P(=S)(OC$_2$H$_5$)$_2$] | $n^{24}$ 1.5776 | 89 |
| XXIII$_4$ | ![Cl$_3$-phenyl with C=N-O-P(=S)(OC$_2$H$_5$)$_2$] | $n^{22}$ 1.5578 | 83 |

EXAMPLE 9

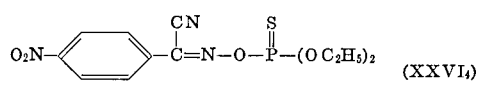

(XXVI$_4$)

91 grams (0.48 mol) α-oximino-4-nitrophenyl-acetic acid nitrile (M.P. 164 to 165° C.; prepared according to M. R. Zimmermann, Journal für praktische Chemie (2), 66, 371/1902) are dissolved in 700 cc.. acetone, 79 g. (0.57 mol finely-powdered potassium carbonate are introduced and the mixture is then further stirred at 20° C. for 30 minutes, while cooling. The strongly coloured potassium salt of the oximino compound thereby crystallises out. The suspension is just stirrable. The reaction mixture is treated at 20 to 25° C., while further cooling, with 76 g. (0.4 mol) O,O-diethyl-thionophosphoric acid ester chloride and then stirred at room temperature for another hour. During this operation, the suspension again becomes stirrable and brightens. The reaction mixture is subsequently poured into water, the precipitated oil taken up with benznee, the benzene solution is shaken twice with a 2 N sodium hydroxide solution and then washed until the reaction is neutral. After drying the organic phase The following compounds are obtained in an analogous manner by reaction with the corresponding ester chlorides:

| | Constitution | Physical properties | Yield (percent of theory) |
|---|---|---|---|
| XV₆ | C₆H₅—C(CN)=N—O—P(=O)(OC₂H₅)(C₂H₅)... | $n^{22}$ 1.5149 | 75.5 |
| XXXIV₆ | phenyl—C(CN)=N—O—P(=S)(CH₃)(OC₂H₅) | $n^{24}$ 1.5625 | 72.5 |
| XXXIX₃ | phenyl—C(CN)=N—O—P(=S)(C₆H₅)(OCH₃) | $n^{23}$ 1.6064 | 84 |
| XXII₄ | phenyl—C(CN)=N—O—P(=S)(C₆H₅)(OC₂H₅) | $n^{23}$ 1.5964 | 69 | over anhydrous sodium sulphate, the solvent is distilled off. 105 grams (76.5% of theory) O,O-diethyl-thionophosphoryl-α-oximino-4-nitrophenyl-acetic acid nitrile remain as a dark brown, viscous oil in refractive index $n^{21}$ 1.5646.

*Analysis.*—Calculated for a molecular weight of 343.2: N, 12.24%; S, 9.34%; P, 9.02%. Found: N, 12.18%; S, 9.48%; P, 9.06%.

The following compounds can be prepared in a manner analogous to that described in Example 1 from the sodium salts of α-oximino-4-methoxy-, α-oximino-4-methyl-mercapto- and α-oximino-1-naphthyl-acetic acid nitrile of melting points 81° C., 112° C. and 105° C., respectively:

| | Constitution | Physical properties | Yield (percent of theory) |
|---|---|---|---|
| XXIX₅ | CH₃O—C₆H₄—C(CN)=N—O—P(=S)(OC₂H₅)₂ | $n_{22}$ 1.5545 | 71.5 |
| XVI₅ | CH₃S—C₆H₄—C(CN)=N—O—P(=S)(OC₂H₅)₂ | $n_{21}$ 1.5790 | 84 |
| XXVIII₅ | naphthyl—C(CN)=N—O—P(=S)(OC₂H₅)₂ | $n_{22}$ 1.5858 | 73.5 |

EXAMPLE 10

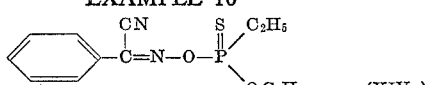

(XIV₁₃)

69 grams (0.4 mol) ethyl-O-ethyl-thionophosphonic acid ester chloride are added dropwise at 25 to 30° C., while cooling, to a suspension of 81 g. (0.48 mol) of the sodium salt of α-oximino-phenylacetic acid nitrile in 200 cc. acetone, the mixture is stirred at room temperature for one hour, then poured into water and the precipitated oil is taken up with benzene. The benzene solution is washed with water and a 2 N sodium hydroxide solution, dried over anhydrous sodium sulphate and the solvent distilled off under reduced pressure. 109 grams (97.5% of theory) ethyl - O-ethyl-thionophosphonyl-α-oximino-phenylacetic acid nitrile remain in the form of an orange-coloured oil of refractive index $n^{24}$ 1.5556.

*Analysis.*—Calculated for a molecular weight of 382.3: P, 10.97%; S, 11.36%; N, 9.92. Found: P, 11.17%; S, 11.74%; N, 9.68%.

EXAMPLE 11

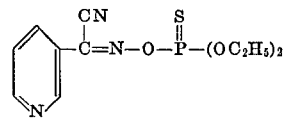

(LX₁)

81 grams (0.48 mol) of the sodium salt of α-oximino-3-pyridyl-acetic acid nitrile (prepared from pyridyl-3-methyl cyanide and isoamyl nitrite in the presence of sodium methylate; M.P. of the α-oximino compound 239° C., with decomposition) are suspended in 500 cc. acetone. 76 grams (0.4 mol) O,O-diethyl-thionophosphoric acid ester chloride are added dropwise to this suspension, while cooling with ice water, the mixture is stirred for one hour, then poured into water and the precipitated oil taken up with benzene. The benzene solution is washed with water and a 2 N sodium hydroxide solution and subsequently dried over anhydrous sodium sulphate. After distilling off the solvent, 110 g. (92.2% of theory) O,O-diethyl-thionophosphoryl-α-oximino-3-pyridyl-acetic acid nitrile are obtained in the form of an orange to brownish coloured oil of refractive index $n^{23}$ 1.5341.

*Analysis.*—Calculated for a molecular weight of 299.3: N, 14.04%; S, 10.71%; P, 10.35%. Found: 13.59%; S, 10.75%; P, 10.17%.

The following compound is obtained in the same manner by reaction with the corresponding O,O-di-n-propyl-thionophosphoric acid ester chloride:

the following products are obtained:

(a′) O - tert.butyl-N-dimethylamido-thionophosphoryl-α-oximino-(2,3,4-trichloro)-phenyl acetic acid nitrile;

(b′) O-(3 - chloro)-n-propyl-N-ethyl-N-tert.butyl-amido-thionophosphoryl - α - oximino-(3 - isobutyl)-phenyl acetic acid nitrile; and (c′) Cyclohexyl - O - (1-methyl - 3 - chloro)-n-propyl-thionophosphonyl - α - oximino-(2-n-butyl-mercapto)-phenyl acetic acid nitrile.

| Constitution | | Physical properties | Yield (percent of theory) |
|---|---|---|---|
| XXVII₂ | 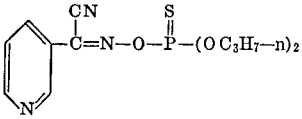 | $n^{23}$ 1.5309 | 79.7 |

EXAMPLE 12

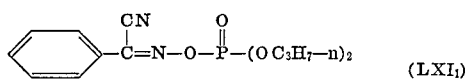 (LXI₁)

A suspension of 68 g. (0.4 mol) of the sodium salt of α-oxmino-phenylacetic acid nitrile in 450 cc. acetone is mixed dropwise at 25 to 30° C. with 67 g. (0.33 mol) O,O-di-n-propyl-phosphoric acid ester chloride. After stirring the mixture at room temperature for one hour, it is poured into water and the precipitated oil is taken up with benzene. The benzene solution is washed with water and a 2 N sodium hydroxide solution. After washing again with water until the reaction is neutral, the organic layer is dried over anhydrous sodium sulphate and the solvent distilled off. 95 grams 92% of theory) O,O-di-n-propyl-phosphoryl-α-oximino-phenylacetic acid nitrile remain in the form of a pale yellow oil of refractive index $n^{22}$ 1.5055.

*Analysis.*—Calculated for a molecular weight of 310.3: P, 9.98%; N, 9.03%. Found: P, 10.41%; N, 8.73%.

The following compound is obtained in an analogous manner by reaction with O,O-di-isopropyl-phosphoric acid ester chloride:

In accordance with a preferred feature of the present invention, the following compounds have been found to be of significance:

O,O-dialkyl-thionophosphoryl-α-oximino-phenylacetic acid nitrile having the formula:

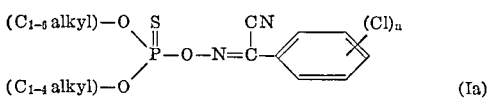 (Ia)

in which $n$ is a number from 0 to 3;

| Constitution | | Physical properties | Yield (percent of theory) |
|---|---|---|---|
| LXII₁ | 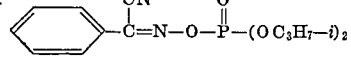 | $n^{22}$ 1.4925 | 92 |

EXAMPLE 13

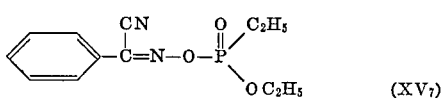 (XV₇)

81 grams (0.48 mol) of the sodium salt of α-oximino-phenylacetic acid nitrile are suspended in 500 cc. acetone, 63 g. (0.4 mol) ethyl-O-ethyl-phosphonic acid ester chloride (B.P. 54° C./2 mm. Hg) are added dropwise to this suspension at 25 to 30° C., while cooling, the mixture is stirred for one hour, then poured into water, the precipitated oil is taken up with benzene, the benzene solution is washed with water and a 2 N sodium hydroxide solution and the reaction mixture worked up in the manner hereinbefore described. After distilling off the solvent, 85 g. (75.5% of theory) ethyl-O-ethyl-phosphonyl-α-oximino-phenylacetic acid nitrile remain in the form of an orange-tinted yellow oil of refractive index $n^{22}$ 1.5149.

EXAMPLE 14

Using the procedure of Example 1, for instance with corresponding molar amounts of the following:

(a) O-tert.-butyl-N-dimethylamido-thionophosphoric acid ester chloride and α-oximino-(2,3,4-trichloro)-phenyl acetic acid nitrile;

(b) O-(3-chloro)-n-propyl-N-ethyl - N - tert.butyl amido-thionophosphoric acid ester chloride and α-oximino-(3-isobutyl)-phenyl acetic acid nitrile; and (c) Cyclohexyl-O-(1 - methyl-3-chloro)-n-propyl-thionophosphonic acid ester chloride and α-oximino-2-n-butyl-mercapto)-phenyl acetic acid nitrile, O,O-dialkyl-phosphoryl - α - oximino-phenylacetic acid nitrile having the formula:

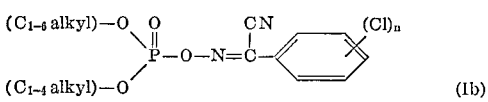 (Ib)

in which $n$ is a number from 0 to 3;

alkyl-O-alkyl-thionophosphonyl - α - oximino-phenylacetic acid nitrile having the formula:

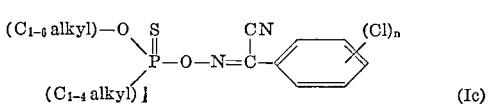 (Ic)

in which $n$ is a number from 0 to 3;

alkyl-O-alkyl-phosphonyl - α - oximino-phenylacetic acid nitrile having the formula:

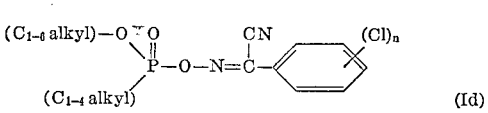 (Id)

in which $n$ is a number from 0 to 3;

Particularly important compounds of the present invention are:

IV O,O-diethyl-thionophosphoryl - α - oximino-phenylacetic acid nitrile;

XVIII O,O-diethyl-thionophosphoryl - α - oximino-2-chlorophenyl acetic acid nitrile.

Also, of significance are:

III O,O-dimethyl-thionophosphoryl - α - oximino-phenyl-acetic acid nitrile;
VI O,O-diethyl-thionophosphoryl - α - oximino-4-chloro-phenylacetic acid nitrile;
VII O,O - diethyl-phosphoryl - α - oximino-phenylacetic acid nitrile;
X O-methyl-O-isopropyl-thionophosphoryl - α - oximino-phenyl-acetic acid nitrile;
XII O-ethyl-O-isopropyl-thionophosphoryl - α - oximino-phenylacetic acid nitrile;
XIV Ethyl-O-ethyl-thionophosphonyl - α - oximino-phenyl-acetic acid nitrile;
XIX O - methyl-O-isopropyl-thionophosphoryl - α - oximino-2-chloro-phenylacetic acid nitrile.

Further compounds of significance according to the invention are:

V O,O-dimethyl-thionophosphoryl - α - oximino-4-chloro-phenylacetic acid nitrile;
IX O - methyl-O-ethyl-thionophosphoryl - α - oximino-phenyl-acetic acid nitrile;
XI O-methyl-O-isopropyl-thionophosphoryl - α - oximino-4-chloro-phenylacetic acid nitrile;
XX O,O - diisopropyl-thionophosphoryl - α - oximino-phenylacetic acid nitrile;
XXI O,O - di-n-propyl-thionophosphoryl - α - oximino-phenylacetic acid nitrile;
XXIV O,O-diethyl-thionophosphoryl - α - oximino-2,6-di-chlorophenyl acetic acid nitrile, as well as VIII O-cyclohexyl-O-methyl-thionophosphoryl - α - oximino-phenylacetic acid nitrile;
XVI O,O-diethyl-thionophosphoryl - α - oximino-4-methylmercaptophenylacetic acid nitrile;
XV Ethyl-O-ethyl-phosphonyl - α - oximino-phenylacetic acid nitrile;
XVII O,O-diethyl-thionophosphoryl - α - oximino-3-pyridylacetic acid nitrile;
XXII Phenyl - O - ethyl-thionophosphonyl - α - oximino-phenylacetic acid nitrile;
XXIII O,O-diethyl-thionophosphoryl - α - oximino-trichlorophenylacetic acid nitrile;
XXVI O,O-diethyl-thionophosphoryl - α - oximino-4-nitrophenylacetic acid nitrile;
XXVIII O,O-diethyl-thionophosphoryl - α - oximino-1-naphthylacetic acid nitrile;
XXIX O,O - diethyl-thionophosphoryl - α - oximino-4-methoxyphenylacetic acid nitrile;
XXX N - isopropyl-O-isopropyl-thionophosphorylamido-α-oximino-phenylacetic acid nitrile;
XXXVI O,O-di(2-chloroethyl)-thionophosphoryl - α - oximino phenylacetic acid nitrile;
XXXVII O-phenyl - O - methyl-thionophosphoryl-α-oximinophenylacetic acid nitrile.

Advantageously, in accordance with the present invention, in the foregoing formulae:

$R_1$ represents alkyl having 1–6 carbon atoms, such as methyl, ethyl, n-propyl, iso-propyl, n-butyl, iso-butyl, sec.-butyl, tert.-butyl, n-ampyl, iso-amyl, n-hexyl, iso-hexyl, and the like, especially straight and branched $C_{1-6}$ alkyl, and preferably methyl, ethyl, n-propyl, iso-propyl, n-butyl, iso-butyl, sec.-butyl, n-hexyl, and the like; or halo-alkyl having 1–6 carbon atoms, such as methyl, ethyl, n-propyl, iso-propyl, n-butyl, iso-butyl, sec.-butyl, tert.-butyl, n-amyl, iso-amyl, n-hexyl, iso-hexyl, and the like, which are substituted with one or more halo atoms, especially mono-, di- and poly-substituted chloro, bromo, iodo and fluoro, and most especially di- and poly-mixed substituted chloro, bromo, iodo and fluoro alkyl having 1–6 carbon atoms, such as the individual radicals enumerated immediately hereinabove, especially mono- and poly-halo, and most especially mono- and poly-chloro substituted straight and branched $C_{1-4}$ alkyl of the types mentioned, particularly chloroethyl;

$R_2$ represents alkyl having 1–4 carbon atoms, such as methyl, ethyl, n-propyl, iso-propyl, n-butyl, iso-butyl, sec.-butyl, tert.-butyl, and the like; alkoxy having 1–4 carbon atoms, such as methoxy, ethoxy, n-propoxy, n-butoxy, iso-butoxy, sec.-butoxy, tert.-butoxy, and the like; halo-alkoxy having 1–4 carbon atoms, such as the foregoing enumerated methoxy to tert.-butoxy inclusive which are mono-, di- or poly-substituted with chloro, bromo, iodo, and fluoro atoms, especially di- and poly-mixed substituted chloro, bromo, iodo and fluoro, and particularly mono- and polyhalo, especially chloro, substituted $C_{1-4}$ alkoxy, e.g., chloro-ethoxy; lower alkyl-amino, such as methyl-amino, ethyl-amino, n-propyl-amino, iso-propyl-amino, n-butyl-amino, iso - butyl - amino, sec. - butyl - amino, tert.-butyl-amino, and the like, and especially mono-$C_{1-4}$ alkyl-amino; di(lower)alkyl-amino, such as di-methyl-amino to di-tert.-butyl-amino inclusive, and mixed N-methyl-N-ethyl- to -tert.-butyl- -amino, N-ethyl-N-n-propyl- to -tert.-butyl- -amino, N-n-propyl-N-iso-propyl- to -tert.-butyl--amino, N-iso-propyl-N-n-butyl- to -tert.-butyl- -amino, N-n-butyl-N-iso-butyl- to -tert.-butyl- -amino, N-iso-butyl-N-sec.-butyl-amino and N-sec.-butyl-N-tert.-butyl-amino, and especially di($C_{1-4}$)-alkyl-amino; phenyl; phenoxy; cyclohexyl; or cyclohexyloxy;

$R_3$ represents phenyl; naphthyl, such as α- and β-naphthyl; pyridyl, such as α- and β-pyridyl; or substituted phenyl which is substituted with 1–3 halo atoms, such as 1–3 chloro, bromo, iodo or fluoro, especially mono-, di- and tri-chloro-phenyl, including 2,4-, 2,6-, and 3,4-di-chloro-phenyl, and 2,3,4-, 2,3,5-, 2,3,6-, 2,4,5-, and 3,4,5-tri-chloro-phenyl; lower alkyl such as methyl to tert.-butyl inclusive, substituted phenyl, e.g. tolyl, and especially $C_{1-4}$ alkyl phenyl; lower alkoxy, such as methoxy to tert.-butoxy inclusive, e.g. methoxy-phenyl, especially $C_{1-4}$ alkoxy phenyl; lower alkylmercapto, such as methylmercapto to tert.-butylmercapto inclusive, e.g. methylmercapto-phenyl, and especially $C_{1-4}$ alkylmercapto-phenyl; nitro-phenyl; and the like; and X is oxygen or sulfur, preferably sulfur.

In accordance with a preferred feature of the present invention, $R_1$ is $C_{1-6}$ alkyl or $C_{1-4}$ chloro-alkyl; $R_2$ is $C_{1-4}$ alkyl, $C_{1-4}$ alkoxy, $C_{1-4}$ chloro-alkoxy, mono-$C_{1-4}$ alkyl-aimno, di-$C_{1-4}$ alkyl-amino, phenyl, phenoxy, cyclohexyl, and cyclo-hexyloxy; $R_3$ is phenyl, mono-, di- and trichloro-phenyl, $C_{1-4}$ alkyl-phenyl, $C_{1-4}$ alkoxy-phenyl, $C_{1-4}$ alkoxymercapto-phenyl, nitro-phenyl, naphthyl, and pyridyl; and X is oxygen or sulfur, preferably sulfur.

It will be realized by the artisan that all of the foregoing ester compounds contemplated by the present invention possess the desired pesticidal, especially insecticidal and acaricidal, activity, even where used in connection with alkaline substrates, such as limed substrates, all of such compounds possessing extremely low phytotoxicity as regards cultivated plants, as well as extremely low toxicity towards warm-blooded animals.

It will be appreciated that as contemplated herein, the terms "arthropod," "arthropodicidal" and "arthropodicide" may be defined as encompassing specifically both insects and acarids within the comtemplation of their meaning, for convenience in determining the collective aspects of utility herein. Thus, the insects and acarids may be considered herein collectively as arthropods to be combated collectively in accordance with the invention, and accordingly the insecticidal and/or acaricidal activity may be termed arthropodicidal activity, and the concomitant combative or effective amount used in accordance with the invention will be an arthropodicidally effective amount which in essence means an insecticidally or acaricidally effective amount of the active compound for the desired purpose.

It will be appreciated that the instant specification and examples are set forth by way of illustration and not limitation, and that various modifications and changes

What is claimed is:

1. Phosphorus-containing α-oximino-aryl acetic acid nitrile having the formula:

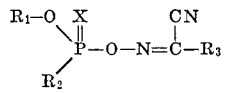

in which $R_1$ is selected from the group consisting of alkyl having 1 to 6 carbon atoms, and haloalkyl having 1 to 6 carbon atoms, $R_2$ is selected from the group consisting of alkyl having 1 to 4 carbon atoms, alkoxy having 1 to 4 carbon atoms, haloalkoxy having 1 to 4 carbon atoms, lower alkyl amino, di(lower) alkyl amino, phenyl, phenoxy, cyclohexyl, and cyclohexyloxy, $R_3$ is selected from the group consisting of phenyl, naphthyl, and substituted phenyl which is substituted with substituents selected from the group consisting of mono-, di-, and trihalo, lower alkyl, lower alkoxy, lower alkyl mercapto, nitro, and mixtures thereof, and X is selected from the group consisting of oxygen and sulfur.

2. Nitrile according to claim 1 wherein $R_1$ is selected from the group consisting of $C_{1-6}$ alkyl, and $C_{1-4}$ chloroalkyl, $R_2$ is selected from the group consisting of $C_{1-4}$ alkyl, $C_{1-4}$ alkoxy, $C_{1-4}$ chloroalkoxy, mono($C_{1-4}$)alkyl amino, di($C_{1-4}$) alkyl amino, phenyl, phenoxy, cyclohexyl, and cyclohexyloxy, $R_3$ is selected from the group consisting of phenyl, mono-, di-, and tri-chlorophenyl, $C_{1-4}$ alkyl phenyl, $C_{1-4}$ alkoxy phenyl, $C_{1-4}$ alkyl mercaptophenyl, nitrophenyl, and naphthyl, and X is selected from the group consisting of oxygen and sulfur.

3. Nitrile according to claim 1 wherein such compound is O,O - dialkyl-thionophosphoryl-α-oximino-phenylacetic acid nitrile having the formula:

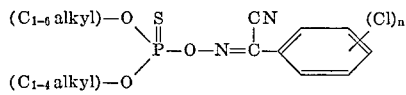

in which $n$ is a number from 0 to 3.

4. Nitrile according to claim 1 wherein such compound is O,O - dialkyl-phosphoryl-α-oximino-phenylacetic acid nitrile having the formula:

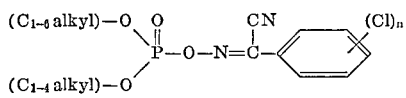

in which $n$ is a number from 0 to 3.

5. Nitrile according to claim 1 wherein such compound is alkyl-O-alkyl-thionophosphonyl-α-oximino-phenylacetic acid nitrile having the formula:

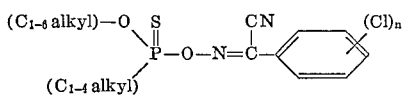

in which $n$ is a number from 0 to 3.

6. Nitrile according to claim 1 wherein such compound is alkyl-O-alkyl-phosphonyl-α-oximino-phenylacetic acid nitrile having the formula:

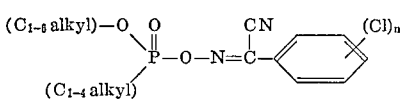

in which $n$ is a number from 0 to 3.

7. Nitrile according to claim 1 wherein such compound is O,O-dimethyl-thionophosphoryl-α-oximino-phenylacetic acid nitrile having the formula:

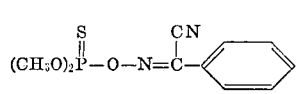

8. Nitrile according to claim 1 wherein such compound is O,O - diethyl-thionophosphoryl-α-oximino-phenylacetic acid nitrile having the formula:

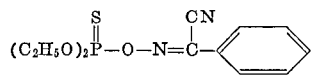

9. Nitrile according to claim 1 wherein such compound is O,O - dimethyl-thionophosphoryl-α-oximino-4-chlorophenylacetic acid nitrile having the formula:

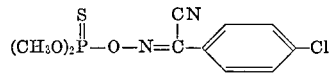

10. Nitrile according to claim 1 wherein such compound is O,O-diethyl-thionophosphoryl-α-oximino - 2-chlorophenylacetic acid nitrile having the formula:

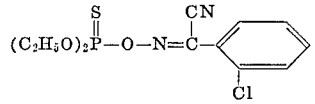

11. Nitrile according to claim 1 wherein such compound is O,O-diethyl-phosphoryl-α-oximino-phenylacetic acid nitrile having the formula:

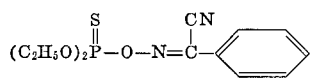

12. Nitrile according to claim 1 wherein such compound is O - cyclohexyl-O-methyl-thionophosphoryl-α-oximino-phenylacetic acid nitrile having the formula:

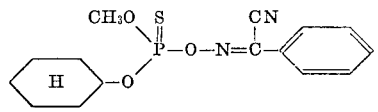

13. Nitrile according to claim 1 wherein such compound is ethyl-O-ethyl-thionophosphonyl-α-oximino-phenylacetic acid nitrile having the formula:

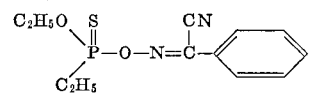

14. Nitrile according to claim 1 wherein such compound is O,O - diethyl-thionophosphoryl-α-oximino - 4-methylmercapto-phenylacetic acid nitrile having the formula:

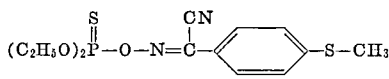

15. Nitrile according to claim 1 wherein such compound is phenyl-O-ethyl-thionophosphoryl-α-oximino - phenylacetic acid nitrile having the formula:

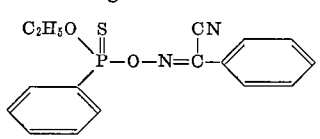

16. Nitrile according to claim 1 wherein such compound is O,O-diethyl-thionophosphoryl-α-oximino-4-nitrophenylacetic acid nitrile having the formula:

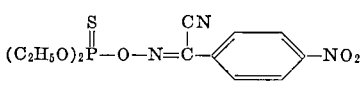

17. Nitrile according to claim 1 wherein such compound is O,O-diethyl-thionophosphoryl-α-oximino - 1 - naphthylacetic acid nitrile having the formula:

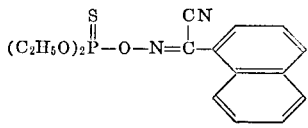

18. Nitrile according to claim 1 wherein such compound is O,O-diethyl-thionophosphoryl-α-oximino - 4 - methoxyphenylacetic acid nitrile having the formula:

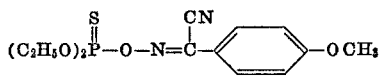

19. Nitrile according to claim 1 wherein such compound is N - isopropyl - O - isopropyl-thionophosphorylamido-α-oximinophenylacetic acid nitrile having the formula

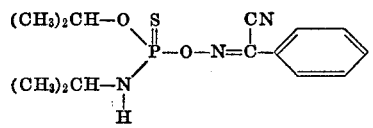

20. Nitrile according to claim 1 wherein such compound is O,O-di(2 - chloroethyl)-thionophosphoryl-α-oximinophenylacetic acid nitrile having the formula:

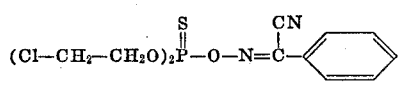

21. Nitrile according to claim 1 wherein such compound is O - phenyl-O-methyl-thionophosphoryl-α-oximino-phenylacetic acid nitrile having the formula:

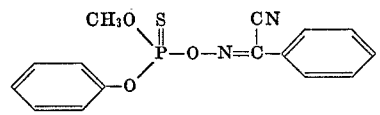

22. A compound of the formula $$\begin{array}{c} R \quad X \\ \diagdown \parallel \\ P-O-N=C-R^2 \\ \diagup \quad \mid \\ R'O \quad CN \end{array}$$

wherein R is alkyl having 1 to 4 carbon atoms or alkoxy having 1 to 4 carbon atoms, R' is alkyl having 1 to 4 carbon atoms, R² is phenyl or phenyl substituted with halogen, nitro, alkyl having 1 to 6 carbon atoms and alkoxy having 1 to 6 carbon atoms and X is oxygen or sulfur.

References Cited
FOREIGN PATENTS
798,703   7/1958   Great Britain _____ 260—935

CHARLES B. PARKER, Primary Examiner

A. H. SUTTO, Assistant Examiner

U.S. Cl. X.R.
260—294.8, 294.9, 968; 424—210

UNITED STATES PATENT OFFICE
CERTIFICATE OF CORRECTION

Patent No. 3591662            Dated July 6, 1971

Inventor(s) Walter Lorenz et al

It is certified that error appears in the above-identified patent and that said Letters Patent are hereby corrected as shown below:

Col. 4, line 20

"strongy" should be -- strongly --

Col. 16, last item in next-to-last column

"0.1" should be -- 0.01 --

Col. 21, line 8

"5" should be -- 35 --

Col. 24, last figure in last col. of Table G

"51" should be -- 5 --

Col. 30, next to last col., 4th item from bottom

"0.5" should be -- 0.25 --

Col. 37, first formula

"i-$C_3H_9O$" should be -- i-$C_3H_7O$ --

(CONTINUED)

PO-1050
(5/69)

UNITED STATES PATENT OFFICE
CERTIFICATE OF CORRECTION

Patent No. 3591662　　　　　　　　Dated July 6, 1971

PAGE - 2

Inventor(s) Walter Lorenz et al

It is certified that error appears in the above-identified patent and that said Letters Patent are hereby corrected as shown below:

Col. 44, last column, 7th line from botton of Table P

Delete "0"

Col. 44, last column, 3rd line from botton of Table P

"6" should be -- 60 --

Col. 43, third formula from bottom

"$C_2H_5$" should be -- $CH_3$ --

Col. 57, (Formula XLVII)

"$(OCH_{25})_2$" should be -- $(OC_2H_5)_2$ --

Col. 65, line 62

"n-ampyl" should be -- n-amyl --

Signed and sealed this 14th day of March 1972.

(SEAL)
Attest:

EDWARD M. FLETCHER, JR.　　　　　　ROBERT GOTTSCHALK
Attesting Officer　　　　　　　　　　Commissioner of Patents